US012092058B2

(12) United States Patent
Suruga et al.

(10) Patent No.: US 12,092,058 B2
(45) Date of Patent: Sep. 17, 2024

(54) FAILURE DIAGNOSIS APPARATUS AND FAILURE DIAGNOSIS METHOD FOR FUEL-EVAPORATION-GAS PURGING SYSTEM

(71) Applicant: Mitsubishi Electric Corporation, Tokyo (JP)

(72) Inventors: Hiroshi Suruga, Tokyo (JP); Shuichi Wada, Tokyo (JP); Yosuke Fukuzawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 81 days.

(21) Appl. No.: 17/947,579

(22) Filed: Sep. 19, 2022

(65) Prior Publication Data

US 2023/0332563 A1 Oct. 19, 2023

(30) Foreign Application Priority Data

Apr. 15, 2022 (JP) ................................ 2022-067498

(51) Int. Cl.
*F02M 25/08* (2006.01)

(52) U.S. Cl.
CPC .... *F02M 25/0818* (2013.01); *F02M 25/0836* (2013.01); *F02M 25/0854* (2013.01); *F02M 25/0872* (2013.01)

(58) Field of Classification Search
CPC ............... F02M 25/08; F02M 25/0809; F02M 25/0818; F02M 25/0836; F02M 25/0856; F02M 25/0872; F02M 25/0889; F02M 26/13; F02M 35/10019; F02M 35/104; F02M 35/10222; F02M 35/0218; F02D 41/0002; F02D 41/004; F02D 41/042; F02D 41/221; F02D 2200/0602; F02D 2041/389
See application file for complete search history.

(56) References Cited

U.S. PATENT DOCUMENTS

| | | |
|---|---|---|
| 5,245,973 A | 9/1993 | Otsuka et al. |
| 5,315,980 A | 5/1994 | Otsuka et al. |

(Continued)

FOREIGN PATENT DOCUMENTS

| | | |
|---|---|---|
| JP | 6-42413 A | 2/1994 |
| JP | 2001-50116 A | 2/2001 |
| JP | 2005-30334 A | 2/2005 |

*Primary Examiner* — Logan M Kraft
*Assistant Examiner* — Johnny H Hoang
(74) *Attorney, Agent, or Firm* — Sughrue Mion, PLLC; Richard C. Turner

(57) ABSTRACT

The failure diagnosis apparatus whether or not a failure exists in a fuel-evaporation-gas purging system that a negative pressure in an intake system of an internal combustion engine is introduced into an accumulator and pressure accumulation is performed in a time period from a time when a driver turns off an ignition key to a time when the internal combustion engine stops its rotation, that the accumulated negative pressure is introduced into a fuel-evaporation-gas path before the internal combustion engine stops the rotation or after the internal combustion engine has stopped the rotation, and that in a time from a time when after the internal combustion engine has stopped the rotation, the driver again turns on the ignition key to a time when the internal combustion engine starts, it is determined whether or not a pressure change in the fuel-evaporation-gas path exists.

20 Claims, 14 Drawing Sheets

(56) References Cited

U.S. PATENT DOCUMENTS

| | | | | |
|---|---|---|---|---|
| 5,425,344 | A | 6/1995 | Otsuka et al. | |
| 6,227,037 | B1 * | 5/2001 | Kawamura | F02M 25/0809 73/40 |
| 6,397,824 | B1 | 6/2002 | Takatsuka et al. | |
| RE41,660 | E * | 9/2010 | Morinaga | F02M 25/0809 73/114.39 |
| 9,856,830 | B2 * | 1/2018 | Dudar | F02M 26/13 |
| 10,584,663 | B1 * | 3/2020 | Yasuzaka | F02M 25/0818 |
| 11,708,780 | B1 * | 7/2023 | Dudar | B01D 53/864 60/274 |
| 11,761,406 | B1 * | 9/2023 | Dudar | F02D 41/003 701/22 |
| 2006/0130568 | A1 * | 6/2006 | Ishii | F02M 25/0827 73/114.38 |
| 2006/0137437 | A1 * | 6/2006 | Tsuyuki | F02M 25/0818 73/114.38 |
| 2011/0166765 | A1 * | 7/2011 | DeBastos | B60K 15/03504 123/520 |
| 2011/0168140 | A1 * | 7/2011 | DeBastos | F02M 25/0818 123/521 |

* cited by examiner

FAILURE DIAGNOSIS APPARATUS AND FAILURE DIAGNOSIS METHOD FOR FUEL-EVAPORATION-GAS PURGING SYSTEM

BACKGROUND OF THE INVENTION

Field of the Invention

The present disclosure relates to a failure diagnosis apparatus and a failure diagnosis method for a fuel-evaporation-gas purging system.

Description of the Related Art

A fuel to be supplied to an internal combustion engine mounted in a vehicle is stored in a fuel tank mounted in the vehicle; however, in the fuel tank, there is produced a gas (hereinafter, referred to as a fuel evaporation gas) formed through evaporation of the fuel stored therein. As is well known, in general, in order to prevent a fuel evaporation gas produced in a fuel tank from radiating into the air, there is provided a fuel-evaporation-gas purging system configured in such a way that the fuel evaporation gas produced in the fuel tank is temporarily absorbed by an absorbent provided in a canister, the fuel evaporation gas absorbed by the absorbent is purged during operation of the internal combustion engine, and then is radiated into an intake pipe of the internal combustion engine.

When in a fuel-evaporation-gas purging system, for some causes, a fuel-evaporation-gas path for making a fuel evaporation gas flow is broken, the fuel evaporation gas is radiated into the air. Accordingly, in a vehicle provided with a fuel-evaporation-gas purging system, it is required to provide a failure diagnosis apparatus for diagnosing whether or not a failure such as leakage of a fuel evaporation gas exists.

To date, there has been proposed a technology in which after during operation of an internal combustion engine from a time when the internal combustion engine starts due to ON-operation of an ignition key by a vehicle driver to a time when the internal combustion engine stops due to OFF-operation of the ignition key by the driver, the pressure of a fuel-evaporation-gas path is changed from the atmospheric pressure to a negative pressure by use of a negative pressure produced in an intake pipe of the internal combustion engine, a failure in the fuel-evaporation-gas purging system is diagnosed (for example, refer to Patent Documents 1 and 2).

In addition, to date, there has been proposed a technology in which after during a stoppage of an internal combustion engine from a time when the internal combustion engine stops due to OFF-operation of an ignition key by a vehicle driver to a time when the internal combustion engine starts due to ON-operation of the ignition key by the driver, the pressure of a fuel-evaporation-gas path is changed from the atmospheric pressure to a different pressure, whether or not leakage of a fuel evaporation gas exists is diagnosed (for example, refer to Patent Document 3).

Prior Art Reference

Patent Document

[Patent Document 1] Japanese Patent Application Laid-Open No. H6-42413

[Patent Document 2] Japanese Patent Application Laid-Open No. 2001-50116

[Patent Document 3] Japanese Patent Application Laid-Open No. 2005-30334

SUMMARY OF THE INVENTION

In the conventional technologies disclosed in Patent Documents 1 and 2, because after by use of an intake-pipe negative pressure produced during operation of an internal combustion engine, the pressure in the fuel-evaporation-gas path of a fuel-evaporation-gas purging system is changed, a failure in the fuel-evaporation-gas purging system is diagnosed, there have been problems, for example, that the operation for diagnosing a failure is implemented after changing the original operation of the fuel-evaporation-gas purging system or with a limitation of timing that does not provide any effect to the original operation of the fuel-evaporation-gas purging system and that a disturbance makes it difficult to secure the reliability.

In addition, in the conventional technology disclosed in Patent Document 3, it is required that during a stoppage of an internal combustion engine, the pressure in the fuel-evaporation-gas path is measured after being changed from the atmospheric pressure; therefore, because it is required to provide a pressure-changing pump, as a means for changing the pressure in the fuel-evaporation-gas path, a wake-up circuit for making a control unit operate during a stoppage of the internal combustion engine, and the like, there has been a problem, for example, that the apparatus is upsized and the price thereof increases.

The present disclosure is to disclose a technology for solving the foregoing problems; the objective thereof is to provide a failure diagnosis apparatus and a failure diagnosis method, for a fuel-evaporation-gas purging system, that can diagnose whether or not a failure exists in the fuel-evaporation-gas purging system, without upsizing the apparatus and increasing the price thereof and regardless of the original operation of the fuel-evaporation-gas purging system.

A failure diagnosis apparatus for a fuel-evaporation-gas purging system disclosed in the present disclosure is a failure diagnosis apparatus that diagnoses whether or not a failure exists in a fuel-evaporation-gas purging system in which a fuel evaporation gas produced in a fuel tank is absorbed by an absorbent provided in a canister and in which a fuel evaporation gas absorbed by the absorbent is purged so as to be radiated into an intake system of an internal combustion engine; the failure diagnosis apparatus includes a pressure introduction apparatus that introduces an accumulated pressure into a fuel-evaporation-gas path through which the fuel evaporation gas flows, a determination apparatus that determines whether or not leakage of a fuel evaporation gas exists in the fuel-evaporation-gas path, based on a pressure change in the fuel-evaporation-gas path, and a controller that controls at least the pressure introduction apparatus and the determination apparatus; the failure diagnosis apparatus is configured in such a way that the pressure introduction apparatus is controlled by the controller in such away as to introduce a negative pressure in the intake system of the internal combustion engine so as to perform the pressure accumulation in a time period from a time when a driver of a vehicle provided with the internal combustion engine turns off an ignition key to a time when the internal combustion engine stops its rotation and in such a way as to introduce the accumulated negative pressure into the fuel-evaporation-gas path before the internal combustion engine stops the rotation or after the internal combustion engine has stopped the rotation, in such a way that the determination apparatus is controlled by the controller in such away as to determine whether or not a pressure in the fuel-evaporation-gas path into which the negative pressure had been introduced has changed in a time period from a time when after the internal combustion engine has stopped the rotation, the driver turns on the ignition key to a time when the internal combustion engine starts, and in such a way that the controller diagnoses whether or not a failure exists in the fuel-evaporation-gas purging system, based on a result of the determination by the determination apparatus.

A failure diagnosis apparatus for a fuel-evaporation-gas purging system disclosed in the present disclosure is a failure diagnosis apparatus that diagnoses whether or not a failure exists in a fuel-evaporation-gas purging system in which a fuel evaporation gas produced in a fuel tank is absorbed by an absorbent provided in a canister and in which a fuel evaporation gas absorbed by the absorbent is purged so as to be radiated into an intake system of an internal combustion engine; the failure diagnosis apparatus includes a pressure introduction apparatus that introduces an accumulated pressure into a fuel-evaporation-gas path through which the fuel evaporation gas flows, a determination apparatus that determines whether or not leakage of a fuel evaporation gas exists in the fuel-evaporation-gas path, based on a pressure change in the fuel-evaporation-gas path, and a controller that controls at least the pressure introduction apparatus and the determination apparatus; the failure diagnosis apparatus is configured in such a way that the pressure introduction apparatus is controlled by the controller in such a way as to introduce a negative pressure in the intake system of the internal combustion engine and complete the pressure accumulation in a time period from a time when a driver of a vehicle provided with the internal combustion engine turns off an ignition key to a time when the internal combustion engine stops its rotation, in such a way that the pressure introduction apparatus is further controlled by the controller in such a way as to introduce the accumulated negative pressure into the fuel-evaporation-gas path in a time period from a time when after the internal combustion engine has stopped the rotation, the driver turns on the ignition key to a time when the internal combustion engine starts, in such a way that the determination apparatus is controlled by the controller in such a way as to determine whether or not a pressure in the fuel-evaporation-gas path into which the negative pressure had been introduced has changed in a time period from a time when the driver turns on the ignition key to a time when the internal combustion engine starts, and in such a way that the controller diagnoses whether or not a failure exists in the fuel-evaporation-gas purging system, based on a result of the determination by the determination apparatus.

Moreover, a failure diagnosis method for a fuel-evaporation-gas purging system disclosed in the present disclosure is a failure diagnosis method that diagnoses whether or not a failure exists in a fuel-evaporation-gas purging system in which a fuel evaporation gas produced in a fuel tank is absorbed by an absorbent provided in a canister and in which a fuel evaporation gas absorbed by the absorbent is purged so as to be radiated into an intake system of an internal combustion engine; the failure diagnosis method includes a first process of introducing a negative pressure in the intake system of the internal combustion engine into an accumulator so as to perform pressure accumulation, a second process of introducing the accumulated negative pressure into a fuel-evaporation-gas path through which the fuel evaporation gas flows, and a third process of determining whether or not leakage of the fuel evaporation gas exists, based on a pressure change in the fuel-evaporation-gas path into which the negative pressure has been introduced; the failure diagnosis method is configured in such a way that the first process is performed in a time period from a time when a driver of a vehicle provided with the internal combustion engine turns off an ignition key to a time when the internal combustion engine stops its rotation, in such a way that the second process is performed in a time period from a time when the driver turns off the ignition key to a time when the internal combustion engine stops its rotation or after the internal combustion engine stops the rotation, in such a way that the third process is performed in a time period from a time when after the internal combustion engine has stopped the rotation, the driver again turns on the ignition key to a time when the internal combustion engine starts, and in such a way that based on a result of the determination in the third process, it is diagnosed whether or not a failure exists in the fuel-evaporation-gas purging system.

A failure diagnosis method for a fuel-evaporation-gas purging system disclosed in the present disclosure is a failure diagnosis method that diagnoses whether or not a failure exists in a fuel-evaporation-gas purging system in which a fuel evaporation gas produced in a fuel tank is absorbed by an absorbent provided in a canister and in which a fuel evaporation gas absorbed by the absorbent is purged so as to be radiated into an intake system of an internal combustion engine; the failure diagnosis method includes a first process of introducing a negative pressure in the intake system of the internal combustion engine into an accumulator so as to perform pressure accumulation, a second process of introducing the accumulated negative pressure into a fuel-evaporation-gas path through which the fuel evaporation gas flows, and a third process of determining whether or not leakage of the fuel evaporation gas exists, based on a pressure change in the fuel-evaporation-gas path into which the negative pressure has been introduced; the failure diagnosis method is configured in such a way that the first process is performed in a time period from a time when a driver of a vehicle provided with the internal combustion engine turns off an ignition key to a time when the internal combustion engine stops its rotation, in such a way that each of the second process and the third process is performed in a time period from a time when after the internal combustion engine has stopped the rotation, the driver again turns on the ignition key to a time when the internal combustion engine starts, and in such a way that based on a result of the determination in the third process, it is diagnosed whether or not a failure exists in the fuel-evaporation-gas purging system.

The present disclosure makes it possible to obtain a failure diagnosis apparatus and a failure diagnosis method, for a fuel-evaporation-gas purging system, that can diagnose whether or not a failure exists in the fuel-evaporation-gas purging system, without upsizing the apparatus and increasing the price thereof and regardless of the original operation of the fuel-evaporation-gas purging system.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Hereinafter, two or more embodiments of failure diagnosis apparatuses and failure diagnosis methods for a fuel-evaporation-gas purging system, disclosed in the present disclosure, will be explained in detail with reference to the drawings.

Embodiment 1

Figure 1:
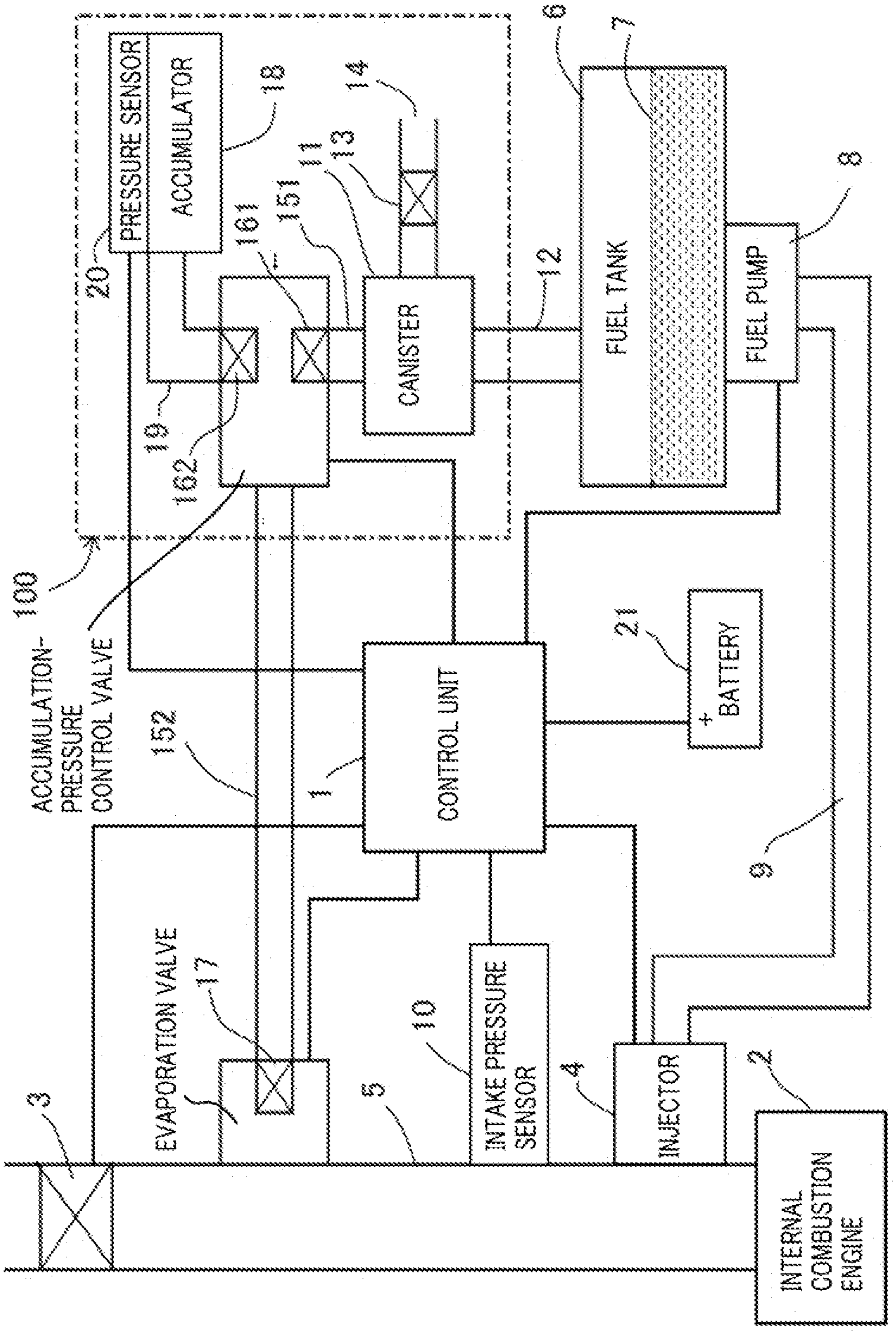
FIG. 1 is an overall configuration diagram representing a fuel-evaporation-gas purging system provided with a failure diagnosis apparatus according to Embodiment 1 and peripheral configurations thereof.

FIG. 1 is an overall configuration diagram representing a fuel-evaporation-gas purging system, for an internal combustion engine, that is provided with a failure diagnosis apparatus according to Embodiment 1, and peripheral configurations thereof. In FIG. 1, a control unit 1, as a controller, is configured with an ECU (Electronic Control Unit). The control unit 1 includes an input I/F for controlling an internal combustion engine 2, and output I/F, and a microcomputer, as a processor. The microcomputer includes a CPU (Central Processing Unit) for executing an internal-combustion-engine control program logic, a nonvolatile memory in which an internal-combustion-engine control program is stored, and the like.

The control unit 1 includes a CPU, as a processor, for executing a fuel-evaporation-gas purging system control program and a program logic for controlling a failure diagnosis apparatus that diagnoses whether or not a failure exists in the fuel-evaporation-gas purging system, a nonvolatile memory in which the fuel-evaporation-gas purging system control program and the program logic for controlling the failure diagnosis apparatus that diagnoses whether or not a failure exists in the fuel-evaporation-gas purging system are stored, and the like. In addition, at least one of the CPU, the nonvolatile memory, and the like may be utilized also as one of the CPU, the nonvolatile memory, and the like for executing the foregoing internal-combustion-engine control program logic.

Figure 10:
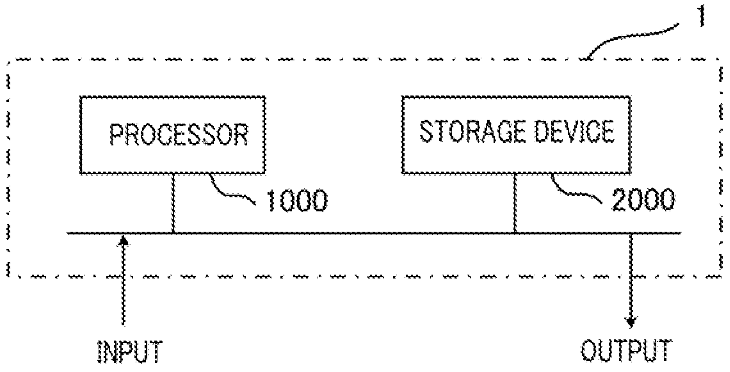
FIG. 10 is a configuration diagram representing an example of the hardware configuration of a control unit in the failure diagnosis apparatus fora fuel-evaporation-gas purging system according to each of Embodiments 1 through 3.

FIG. 10 is a configuration diagram representing an example of the hardware configuration of a control unit in the failure diagnosis apparatus for a fuel-evaporation-gas purging system according to each of Embodiments 1 through 3. As represented in FIG. 10, the control unit 1 includes a processor 1000 and a storage device 2000. Although not represented, the storage device 2000 has a volatile storage device such as a random access memory and a nonvolatile auxiliary storage device such as a flash memory.

In addition, instead of the flash memory, a hard disk drive may be included as an auxiliary storage device. The processor 1000 executes a program inputted from the storage device 2000. In this case, the program is inputted from the auxiliary storage device to the processor 1000 by way of the volatile storage device. Moreover, the processor 1000 may output data such as a calculation result either to the volatile storage device of the storage device 2000 or to the auxiliary storage device by way of the volatile storage device.

In FIG. 1, a cylinder of the internal combustion engine 2 is coupled with an intake pipe 5, as an intake system to which a throttle valve 3 and an injector 4 are mounted. Gasoline, as a fuel 7, is stored in a fuel tank 6. A fuel pump

8 provided in the fuel tank 6 supplies the fuel 7 stored in the fuel tank 6 to the injector 4 by way of a fuel supply path 9. The control unit 1 calculates the amount of the fuel to be injected from the injector 4 into the intake pipe 5, based on an opening degree of the throttle valve 3, an intake pressure detected by the intake pressure sensor 10, and the like.

A fuel-air mixture including the fuel injected into the intake pipe 5 by the injector 4 and air sucked by the intake pipe 5 through the throttle valve 3 is supplied from the intake pipe 5 into the cylinder of the internal combustion engine 2. The fuel-air mixture supplied into the cylinder of the internal combustion engine 2 is ignited to combust by an ignition spark produced by an ignition plug (unillustrated) and drives a piston inside the cylinder, so that driving power for rotating an output axle (unillustrated) of the internal combustion engine 2 is generated.

A canister 11 contains an absorbent for absorbing a fuel evaporation gas. The inside of the canister 11 and the inside of the fuel tank 6 communicate with each other through an evaporation line 12. A canister check valve 13 provided in the canister 11 allows a gas to flow only in a direction from the inside of the canister 11 to the air 14. Purge lines 151 and 152 that make the canister 11 communicate with the intake pipe 5 are connected with the canister 11 and the intake pipe 5 through the intermediary of a first accumulation-pressure control valve 161 and an evaporation valve 17, respectively.

In the fuel-evaporation-gas purging system, a fuel evaporation gas produced at a time when the fuel 7 stored in the fuel tank 6 evaporates is temporarily absorbed by the absorbent contained in the canister 11; during operation of the internal combustion engine 2, a fuel based on the fuel evaporation gas absorbed by the absorbent in the canister 11 is purged; then, the fuel is radiated into the intake pipe 5, as the intake system of the internal combustion engine 2, through the purge lines 151 and 152 and the evaporation valve 17. The fuel-evaporation-gas purging system prevents the fuel evaporation gas from being radiated into the air.

In the present embodiment, the fuel tank 6, the evaporation line 12, the canister 11, and the purge lines 151 and 152 form a fuel-evaporation-gas path, as a path through which a fuel evaporation gas flows.

An accumulator 18 is connected with the purge lines 151 and 152 through the intermediary of an accumulation pressure line 19, the first accumulation-pressure control valve 161, and a second accumulation-pressure control valve 162. The accumulator 18 is provided with a pressure sensor 20 for detecting a pressure in the accumulator 18. A battery 21 connected with the control unit 1 supplies a power source to the control unit 1. As described later, the control unit 1 has a function of self-holding the power source supplied from the battery 21; thus, even when a vehicle driver turns off the ignition key (unillustrated), the control unit 1 can maintain the self-holding of the power source until an after-mentioned predetermined operation ends so as to secure the supply of the power source.

The intake air pressure detected by the intake pressure sensor 10 and the pressure in the accumulator 18 detected by the pressure sensor 20 are inputted to the control unit 1. In addition, various kinds of information items for controlling the internal combustion engine 2 are inputted to the control unit 1; however, the explanations therefor will be omitted, here.

The injector 4, the throttle valve 3, and the fuel pump 8 are controlled based on respective commands from the control unit 1. The evaporation valve 17, the first accumulation-pressure control valve 161, and the second accumulation-pressure control valve 162 are opening/closing-controlled based on respective commands from the control unit 1. In this situation, for example, as described in Cases 1, 2, and 3 below, the control unit 1 can change the respective valves. In the after-mentioned operation of the failure diagnosis apparatus, the control unit 1 performs opening/closing-control of the valves in accordance with the respective operation stages.

Case 1

By opening the second accumulation-pressure control valve 162 and closing the first accumulation-pressure control valve 161, the evaporation valve 17 and the accumulator 18 are connected with each other and the evaporation valve 17 and the canister 11 are disconnected from each other. In this case, the accumulation pressure line 19 and the purge line 151 become paths for connecting the evaporation valve 17 with the accumulator 18.

Case 2

By opening the first accumulation-pressure control valve 161 and closing the second accumulation-pressure control valve 162, the evaporation valve 17 and the canister 11 are connected with each other and the evaporation valve 17 and the accumulator 18 are disconnected from each other. In this case, the purge lines 151 and the 152 become paths for connecting the evaporation valve 17 with the canister 11.

Case 3

By opening the first accumulation-pressure control valve 161 and closing the second accumulation-pressure control valve 162, the evaporation valve 17, the canister 11, and the accumulator 18 are connected with one another. In this case, the accumulation pressure line 19 and the purge line 152 become paths for connecting the evaporation valve 17 with the accumulator 18; the purge lines 151 and the 152 become paths for connecting the evaporation valve 17 with the canister 11; moreover, the purge line 151 and the accumulation pressure line 19 become paths for connecting the canister 11 with the accumulator 18.

Only when for some causes, the pressure in the fuel tank 6, the evaporation line 12, and the canister 11 becomes higher than a predetermined pressure, the canister check valve 13 opens and radiates a gas in the fuel tank 6, the evaporation line 12, and the canister 11 from the canister 11 toward the air so as to protect the fuel-evaporation-gas path.

The control unit 1, the fuel tank 6, the evaporation line 12, the canister 11 containing the absorbent, the purge lines 151 and 152, the evaporation valve 17, and the canister check valve 13 form a fuel-evaporation-gas purging system. As described above, in the fuel-evaporation-gas purging system, in order to prevent a fuel evaporation gas, produced at a time when a fuel evaporates in the fuel tank 6, from being radiated to the air, the fuel evaporation gas is temporarily absorbed by the absorbent contained in the canister 11; then, while the vehicle is running, the fuel evaporation gas is purged from the absorbent in the canister 11, sucked by the intake pipe 5 through the evaporation valve 17, and combusted in the internal combustion engine.

A failure diagnosis apparatus 100 for a fuel-evaporation-gas purging system according to Embodiment 1 is formed in such a way that the first accumulation-pressure control valve 161, the second accumulation-pressure control valve 162, the accumulator 18, and the pressure sensor 20 are added between the canister 11 and the evaporation valve 17 in the fuel-evaporation-gas purging system. Describing in more detail, the failure diagnosis apparatus 100 according to Embodiment 1 includes at least the control unit 1, the accumulator 18, the pressure sensor 20, the accumulation pressure line 19, the first accumulation-pressure control valve 161, and the second accumulation-pressure control valve 162.

In addition, the canister 11, the evaporation line 12, the purge lines 151 and 152, the evaporation valve 17, and the canister check valve 13 form part of the fuel-evaporation-gas purging system; however, these members may be regarded as the constituent elements of the failure diagnosis apparatus.

The accumulator 18, the accumulation pressure line 19, the first accumulation-pressure control valve 161, and the second accumulation-pressure control valve 162 form a pressure introduction apparatus in the failure diagnosis apparatus 100. In other words, the pressure introduction apparatus has the accumulator 18 that introduces a negative pressure of the intake pipe 5, as the intake system of the internal combustion engine 2, so as to perform pressure accumulation, the first accumulation-pressure control valve 161 provided between the canister 11 and the purge line 151, and the second accumulation-pressure control valve 162 provided between the accumulator 18 and the purge line 152.

Figure 5A:
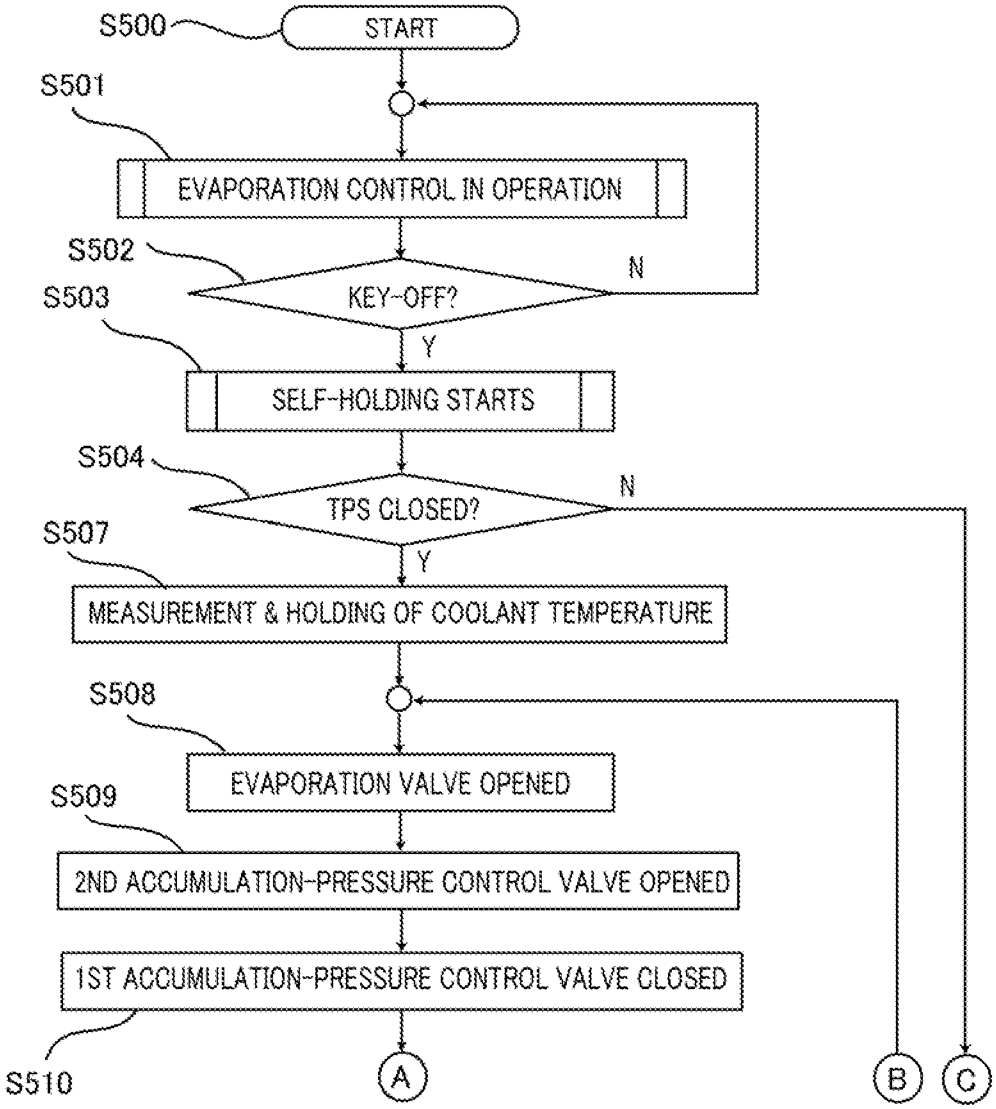
FIG. 5A is a flowchart representing part of the procedure of the operation and the failure diagnosis method of the failure diagnosis apparatus for a fuel-evaporation-gas purging system according to Embodiment 1.
Figure 5B:
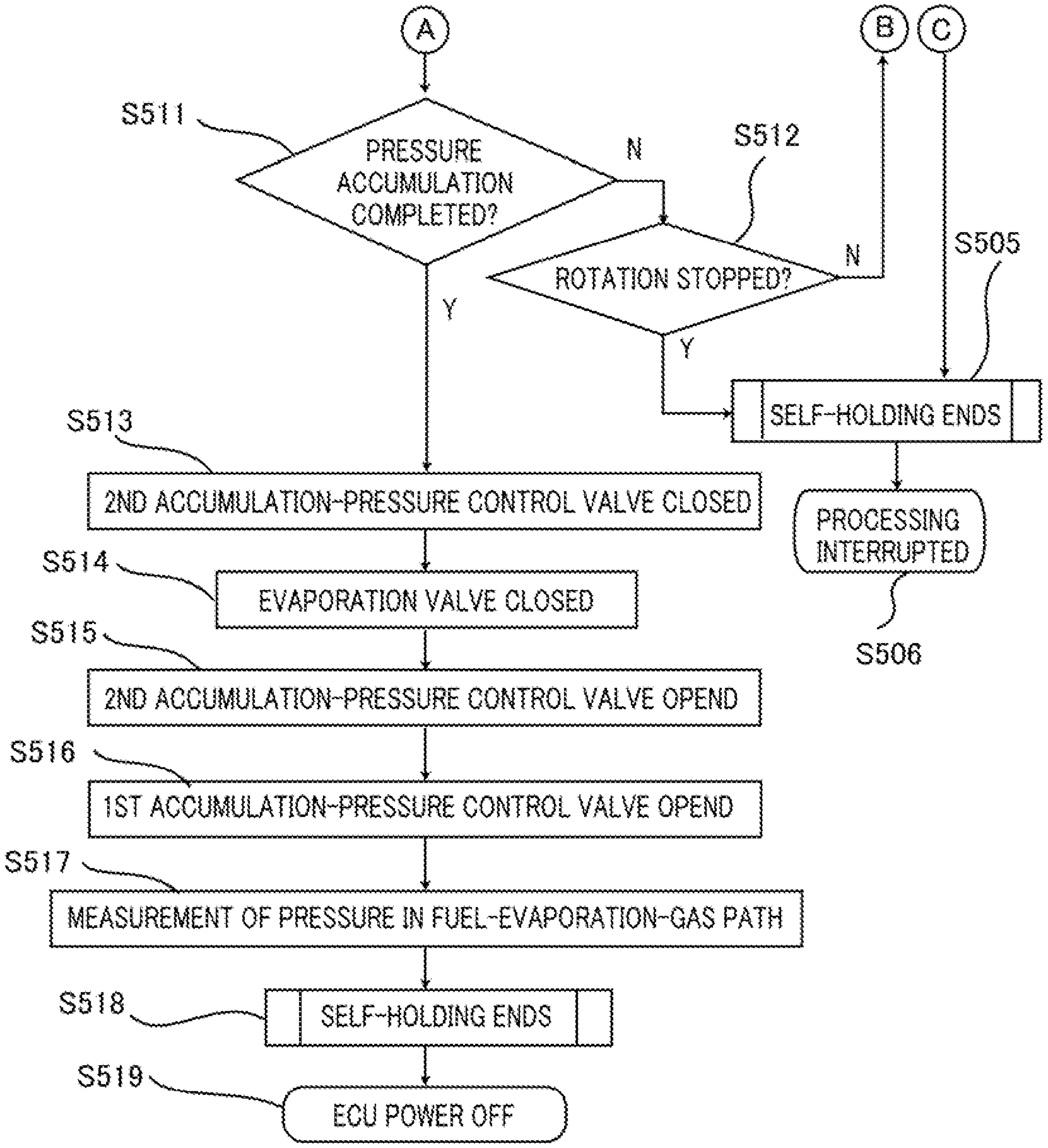
FIG. 5B is a flowchart representing the operation and the procedure following those in FIG. 5A.
Figure 5C:
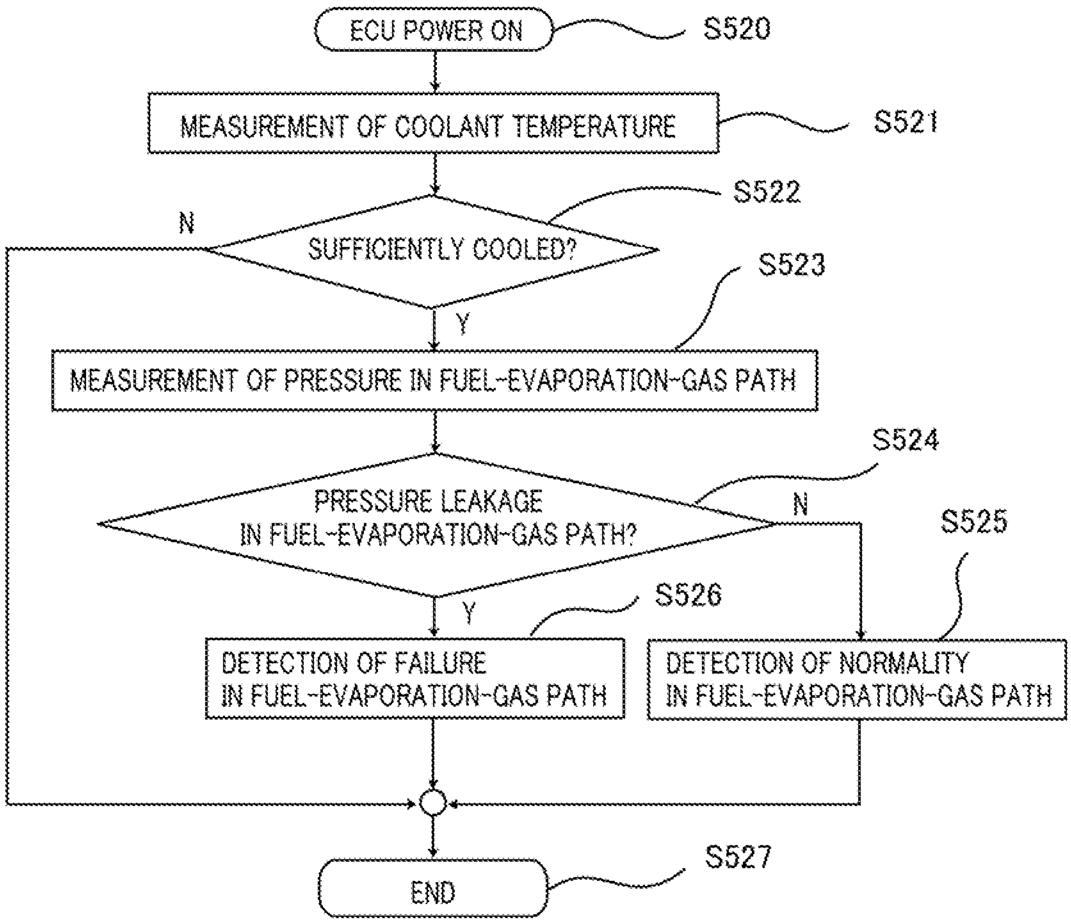
FIG. 5C is a flowchart representing the operation and the procedure to be executed after the operation and the procedure represented in FIG. 5B.

Next, the operation and the failure diagnosis method of the failure diagnosis apparatus for a fuel-evaporation-gas purging system according to Embodiment 1 will be explained. FIG. 5A is a flowchart representing part of the procedure of the operation and failure diagnosis method of the failure diagnosis apparatus for a fuel-evaporation-gas purging system according to Embodiment 1; FIG. 5B is a flowchart representing the operation following that in FIG. 5A; FIG. 5C is a flowchart representing the operation and the procedure to be executed after the operation and the procedure represented in FIG. 5B.

In FIGS. 1, 5A, 5B, and 5C, the internal combustion engine 2 is operated, and the control unit 1, as a failure diagnosis apparatus, starts its operation in the step S500; it is determine in the step S502 whether or not a vehicle driver has turned off the ignition key of the vehicle; in the case where the driver has not turned off the ignition key (N), normal control of the fuel-evaporation-gas purging system is performed in the step S501, while the internal combustion engine is operated; in the case where the driver has turned off the ignition key (Y), the step S502 is followed by the step S503, where the control unit 1, as the failure diagnosis apparatus, starts its operation.

In the step S501, there is performed normal evaporation control in the fuel-evaporation-gas purging system, while the internal combustion engine 2 is operated; specifically, the following control items are performed.

Case 1

In Case 1, the internal combustion engine 2 is operated (after stating) and the throttle valve 3 is closed. In Case 1, the pressure in the intake pipe 5 is negative with respect to the atmospheric pressure. The control unit 1 closes the second accumulation-pressure control valve 162 so as to disconnect the evaporation valve 17 from the accumulator 18 and opens the first accumulation-pressure control valve 161 so as to make the evaporation valve 17, the canister 11, and the fuel tank 6 communicate with one another.

In this situation, the control unit 1 closes the evaporation valve 17 so as to make the absorbent in the canister 11 absorb a fuel evaporation gas, produced in the fuel tank 6, through the evaporation line 12. Moreover, the control unit 1 opens the evaporation valve 17 so as to make the intake pipe 5 suck the fuel, purged from the absorbent in the canister 11, through the purge line 151, the first accumulation-pressure control valve 161, the purge line 152, and the evaporation valve 17; then, along with the fuel from the injector 4, the purged fuel is supplied to the internal combustion engine 2. The foregoing opening/closing control of the evaporation valve 17 is normal control of the evaporation valve 17.

Case 2

In Case 2, the internal combustion engine 2 is operated (after stating) and the throttle valve 3 is opened. In Case 2, the pressure in the intake pipe 5 is the atmospheric pressure, a pressure around the atmospheric pressure, or a boost pressure. The control unit 1 closes the second accumulation-pressure control valve 162 so as to disconnect the evaporation valve 17 from the accumulator 18 and opens the first accumulation-pressure control valve 161 so as to make the evaporation valve 17, the canister 11, and the fuel tank 6 communicate with one another. In this situation, the control unit 1 closes the evaporation valve 17 so as to make the absorbent in the canister 11 absorb a fuel evaporation gas, produced in the fuel tank 6, through the evaporation line 12. The foregoing control of the evaporation valve 17 is normal control of the evaporation valve 17.

Next, in the case where it is determined in the step S502 that the driver has turned off the ignition key (Y), the step S502 is followed by the step S503. In the step S503, until required process to be executed after the key-off operation is completed, the control unit 1 performs self-holding of the power source therefor; then, the step S503 is followed by the step S504.

In the step S504, based on an output signal from the TPS (Throttle Position Sensor) at a time of the key-off operation, the control unit 1 determines whether or not the throttle valve 3 is closed; in the case where the throttle valve 3 is not closed (N), no negative pressure in the intake pipe 5 can be secured, and hence the step S504 is followed by the step S505 in FIG. 5B by way of the node C in FIG. 5A and the node C in FIG. 5B; in the step S505, the control unit 1 ends the self-holding of the power source; then, in the step S506, the control unit 1 interrupts the process to be performed by the failure diagnosis apparatus for a fuel-evaporation-gas purging system.

In the case where it is determined in the step S504 in FIG. 5A that the throttle valve 3 is closed (Y), the step S504 is followed by the step S507, where the control unit 1 measures the coolant temperature of the internal combustion engine 2 and then holds it in the memory. Next, the control unit 1 opens the evaporation valve 17 in the step S508, opens the second accumulation-pressure control valve 162 in the step S509, and closes the first accumulation-pressure control valve 161 in the step S510. As a result, the intake pipe 5 and the accumulator 18 communicate with each other by way of the evaporation valve 17, the purge line 152, and the second accumulation-pressure control valve 162, and the intake pipe 5 is disconnected from the canister 11 by the first accumulation-pressure control valve 161. Accordingly, the negative pressure in the intake pipe 5 is introduced into the accumulator 18.

After the step S510 is completed, the negative pressure in the intake pipe 5, as the intake system of the internal combustion engine 2, is introduced into the accumulator 18 and the accumulation pressure line 19 included in the pressure introduction apparatus and into the purge line 152 of the fuel-evaporation-gas purging system, in the time period from a time when the vehicle driver turns off the ignition key to a time when the internal combustion engine 2 stops its rotation; then, the accumulator 18 accumulates the introduced negative pressure.

Figure 2:
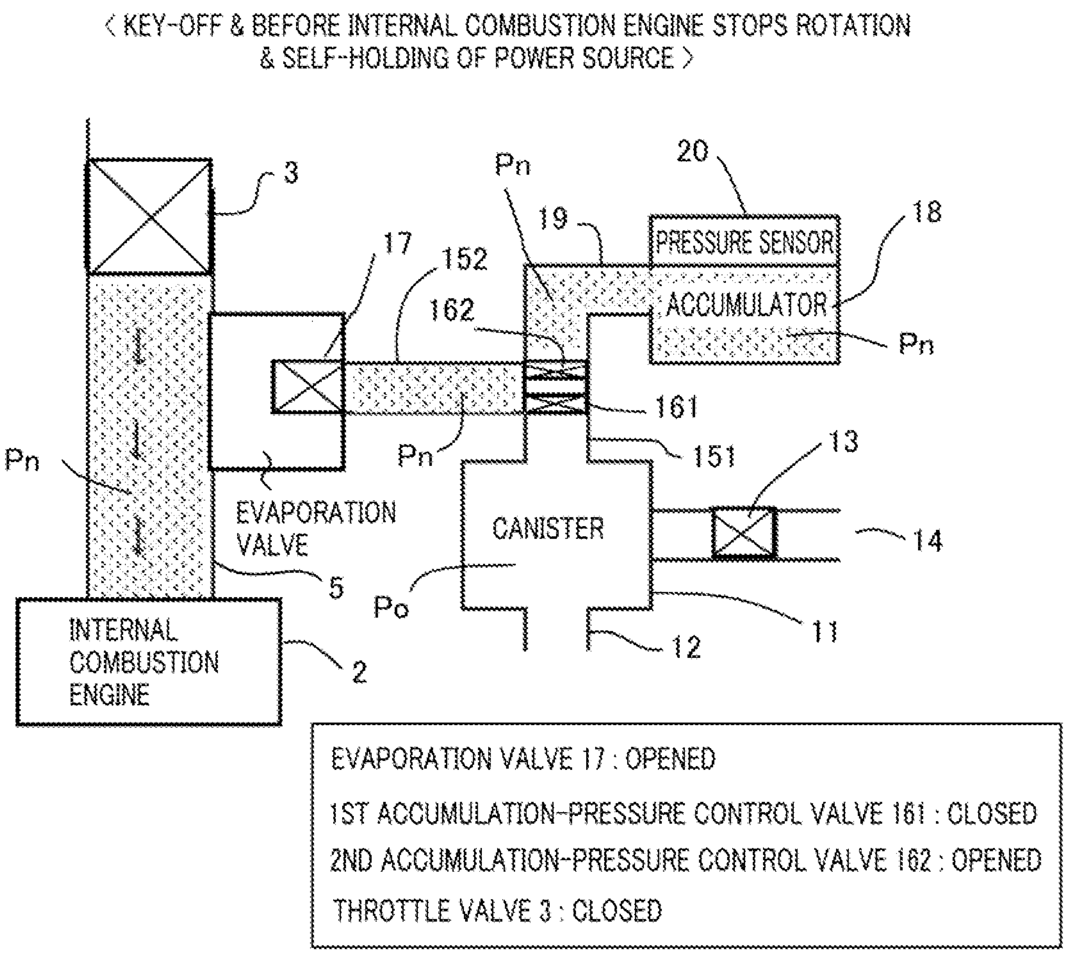
FIG. 2 is an explanatory diagram for explaining a specific operation stage in the procedure of operation and a failure diagnosis method of the failure diagnosis apparatus for the fuel-evaporation-gas purging system according to Embodiment 1.

FIG. 2 is an explanatory diagram for explaining a specific operation stage in the procedure of the operation and the failure diagnosis method of the failure diagnosis apparatus for a fuel-evaporation-gas purging system according to Embodiment 1; FIG. 2 represents the state where after the step S510 has been completed, the accumulator 18 accumulates the negative pressure from the intake pipe 5. Pn and Po in FIG. 2 indicate the area of the negative pressure and the area of the atmospheric pressure or a pressure around the atmospheric pressure, respectively. In the state represented in FIG. 2, the evaporation valve 17 is opened, the first accumulation-pressure control valve 161 is closed, the second accumulation-pressure control valve 162 is opened, and the throttle valve 3 is closed.

Next, the step S510 is followed by the step S511 in FIG. 5B by way of the node A in FIG. 5A and the node A in FIG. 5B. In the step S511, the control unit 1 determines whether or not the pressure accumulation in the accumulator 18 of the pressure introduction apparatus has been completed. The determination in the step S511 is performed based on a detection value of the pressure in the accumulator 18, detected by the pressure sensor 20 provided in the accumulator 18; in the case where the detection value is a low pressure the same as or lower than a predetermined value, it is determined that the pressure accumulation has been completed (Y), and then the step S511 is followed by the step S513.

In contrast, in the case where the detection value of the pressure sensor 20 is not a low pressure the same as or lower than the predetermined value, it is determined that the pressure accumulation has not been completed (N), and then the step S511 is followed by the step S512.

In the step S512 following the step S511, the control unit 1 determines whether or not the internal combustion engine 2 has stopped its rotation; in the case where the internal combustion engine 2 has stopped its rotation (Y), it is suggested that before the pressure accumulation in the accumulator 18 has been completed, the internal combustion engine 2 has stopped its rotation, and hence the predetermined negative pressure can no longer be secured; therefore, the step S512 is followed by the step S505, where the self-holding of the power source by the control unit 1 is ended so that power-source supply to the control unit 1 is cut off; then, in the step S506, the processing to be performed by the failure diagnosis apparatus is interrupted.

In the case where it is determined in the step S512 that the internal combustion engine 2 has not stopped its rotation (N), the step S512 is followed by the step S508 in FIG. 5A by way of the node B in FIG. 5B and the node B in FIG. 5A; then, the foregoing pressure accumulation operation and the ascertainment of the pressure accumulation by the pressure sensor 20 are repeated.

When it is determined in the step S511 that the pressure accumulation has been completed (Y) and then the step S511 is followed by the step S513, the control unit 1 closes the second accumulation-pressure control valve 162; then, in the step S514, the control unit 1 closes the evaporation valve 17 so as to disconnect the purge line 152 from the intake pipe 5. Next, the control unit 1 again opens the second accumulation-pressure control valve 162 in the step S515; furthermore, in the step S516, the control unit 1 opens the first accumulation-pressure control valve 161. The operation in the steps S514 through S516 corresponds to pressure changing operation in which the pressure in the fuel-evaporation-gas path is changed to the negative pressure Pn accumulated in the accumulator 18.

Figure 3:
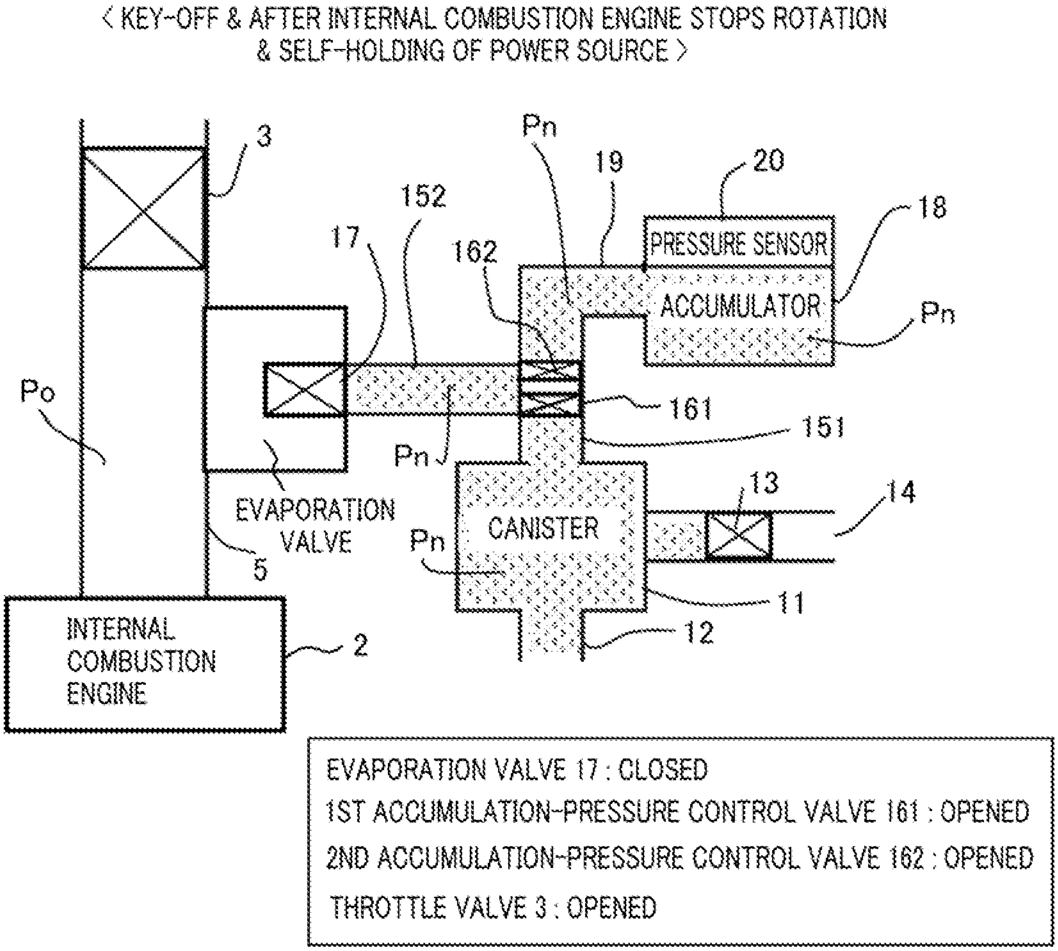
FIG. 3 is an explanatory diagram for explaining an operation stage, which is different from the operation stage in FIG. 2, in the procedure of the operation and the failure diagnosis method of the failure diagnosis apparatus for a fuel-evaporation-gas purging system according to Embodiment 1.

FIG. 3 is an explanatory diagram for explaining an operation stage, which is different from the operation stage in FIG. 2, in the procedure of the operation and the failure diagnosis method of the failure diagnosis apparatus for a fuel-evaporation-gas purging system according to Embodiment 1; FIG. 3 represents the state where after the step S516 in FIG. 5B, the accumulated negative pressure has been introduced from the accumulator 18 into the fuel-evaporation-gas path. Pn and Po in FIG. 3 indicate the area of the negative pressure and the area of the atmospheric pressure or a pressure around the atmospheric pressure, respectively. In the state represented in FIG. 3, the evaporation valve 17 is closed, the first accumulation-pressure control valve 161 is opened, the second accumulation-pressure control valve 162 is opened, and the throttle valve 3 is opened. At this stage, the internal combustion engine 2 has stopped its rotation. In addition, it may be allowed that the internal combustion engine 2 does not stop its rotation.

After the pressure in the fuel-evaporation-gas path has been changed in such a manner as described above, the control unit 1 measures, in the step S517, the pressure in the fuel-evaporation-gas path by use of the pressure sensor 20 and then stores the measurement value in the memory so as to complete the preparation for the failure diagnosis. After the preparation for the failure diagnosis has been completed in the step S517, the control unit 1 cancels the self-holding of the power source in the step S518, so that in the step S519, supply of the power source is cut off. The supply of the power source to the control unit 1 is cut off, based on the condition that the evaporation valve 17 is closed and that each of the first accumulation-pressure control valve 161 and the second accumulation-pressure control valve 162 is opened.

The internal combustion engine 2 stops its rotation at any of timings in the steps S514 through S519 after the step S513 in which after the completion of the pressure accumulation, the second accumulation-pressure control valve 162 is closed. The operation in the steps S514 through S517 is the one in which the accumulated negative pressure is introduced into the fuel-evaporation-gas path; the operation ends before the internal combustion engine 2 stops its rotation or after the internal combustion engine 2 stops its rotation.

Next, the failure diagnosis apparatus for a fuel-evaporation-gas purging system according to Embodiment 1 proceeds to the operation represented in FIG. 5C. The operation represented in FIG. 5C is performed in the time period from a time when the vehicle driver turns on the ignition key to a time when the internal combustion engine 2 starts. In FIGS. 1 and 5C, in the step S520, the driver turns on the ignition key so as to start the internal combustion engine 2 that is at a standstill. As a result, the control unit 1 is supplied with the power source by the battery 21.

Immediately after being supplied with the power source, the control unit 1 measures the coolant temperature of the internal combustion engine 2 in the step S521; then, in the step S522, the control unit 1 determines whether or not the internal combustion engine 2 has sufficiently been cooled. In the case where it is determined in the step S522 that the internal combustion engine 2 has not sufficiently been cooled (N), the step S522 is followed by the step S527, where the processing is ended; in the case where it is determined in the step S522 that the internal combustion engine 2 has sufficiently been cooled (Y), the following determination on whether or not a failure exists is performed.

In the step S523, the control unit 1 measures the pressure in the fuel-evaporation-gas path by use of the pressure sensor 20; then, the step S523 is followed by the step S524. In the step S524, the control unit 1 compares the value of the pressure in the fuel-evaporation-gas path, which has been measured in the foregoing step S517 and has been stored in the memory, with the pressure measurement value obtained by the present measurement so as to determine whether or not pressure leakage exists in the fuel-evaporation-gas path.

In other words, when it is determined in the step S524 that the present measurement value obtained in the step S523 has changed from the measurement value that had been obtained and stored in the step S517, the control unit 1 determines that pressure leakage exists in the fuel-evaporation-gas path, i.e., leakage of the fuel evaporation gas exists (Y); then, in the step S526, the control unit 1 diagnoses that a failure exists in the fuel-evaporation-gas path, i.e., that a failure exists in the fuel-evaporation-gas purging system; then, in the step S527, the control unit 1, as the failure diagnosis apparatus, ends its operation. After the completion of the determination, the valve for the accumulator 18 is closed, so that the evaporation path is returned to the normal one.

In contrast, when it is determined in the step S524 that the present measurement value obtained in the step S523 has not changed from the measurement value that had been stored in the step S517, the control unit 1 determines that pressure leakage does not exist in the fuel-evaporation-gas path (N); then, in the step S525, the control unit 1 diagnoses that no failure exists in the fuel-evaporation-gas path, i.e., that no failure exists in the fuel-evaporation-gas purging system; then, in the step S527, the control unit 1, as the failure diagnosis apparatus, ends its operation. After the completion of the determination, the valve for the accumulator 18 is closed, so that the evaporation path is returned to the normal one.

In the determination on pressure leakage in the step S524, with regard to a value of the difference between the measurement value that had been stored in the step S517 and the present measurement value in the step S523, with which or larger, it is determined that pressure leakage exists in the fuel-evaporation-gas path, i.e., with regard to which value should be the determination threshold value, it is only necessary to appropriately perform setting while considering the practical diagnosis accuracy of the failure diagnosis apparatus.

Variant Example of Embodiment 1

Figure 4:
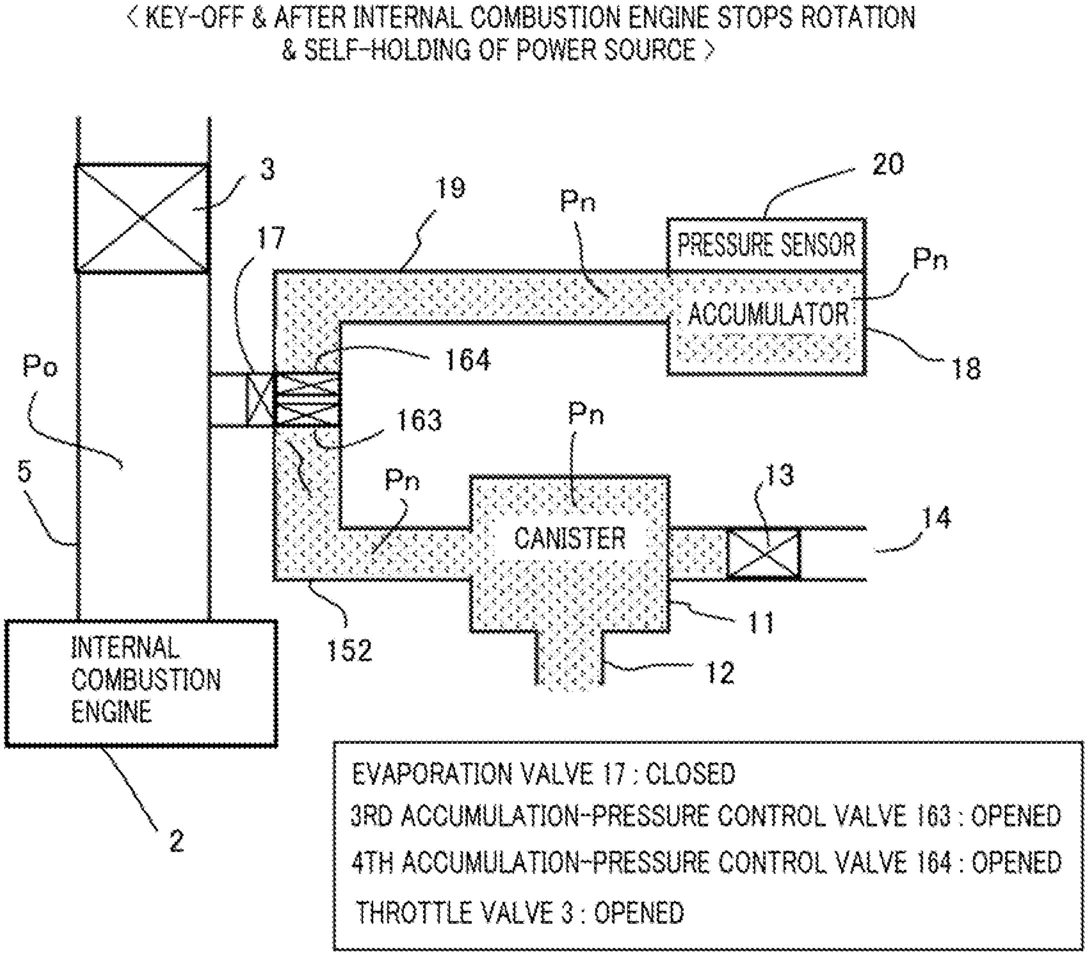
FIG. 4 is an explanatory diagram for explaining a specific operation stage in a variant example of Embodiment 1.

FIG. 4 is an explanatory diagram for explaining a specific operation stage in a variant example of Embodiment 1. In the variant example of Embodiment 1 represented in FIG. 4, the pressure introduction apparatus has the accumulator 18 that introduces a negative pressure of the intake system of the internal combustion engine 2 so as to perform pressure accumulation, a third accumulation-pressure control valve 163 provided between the purge line 152 and the evaporation valve 17, and a fourth accumulation-pressure control valve 164 provided between the accumulator 18 and the evaporation valve 17.

That is to say, in the failure diagnosis apparatus of the variant example of Embodiment 1, the third accumulation-pressure control valve 163 and the fourth accumulation-pressure control valve 164 in the pressure introduction apparatus are arranged around the evaporation valve 17 in a concentrated manner. In the variant example of Embodiment 1, the purge line 151, represented in FIG. 1, for connecting the accumulator 18 with the canister 11 does not exist. The other configurations are the same as those of the failure diagnosis apparatus for a fuel-evaporation-gas purging system according to Embodiment 1 represented in FIG. 1.

FIG. 4 represents the state where after the step S516 in FIG. 5B, the accumulated negative pressure has been introduced from the accumulator 18 into the fuel-evaporation-gas path. Pn and Po in FIG. 4 indicate the area of the negative pressure and the area of the atmospheric pressure or a pressure around the atmospheric pressure, respectively. In the state represented in FIG. 4, the evaporation valve 17 is closed, the third accumulation-pressure control valve 163 is opened, the fourth accumulation-pressure control valve 164 is opened, and the throttle valve 3 is opened.

In addition, the variant example of Embodiment 1 represented in FIG. 4 can also be utilized as a variant example of the failure diagnosis apparatus for a fuel-evaporation-gas purging system according to each of after-mentioned Embodiments 2 and 3.

The foregoing failure diagnosis apparatus and failure diagnosis method for a fuel-evaporation-gas purging system according to Embodiment 1 are reductions to practice of the failure diagnosis apparatus for a fuel-evaporation-gas purging system according to any one of claims 1 through 5, and 8 and the failure diagnosis method for a fuel-evaporation-gas purging system according to claim 18.

In the failure diagnosis method for the fuel-evaporation-gas purging system according to claim 11, the first process corresponds to the processing in the steps S508 through S510 in FIG. 5A; the second process corresponds to the processing in the steps S514 through S516 in FIG. 5B; the third process corresponds to the processing in the steps S523 through S526 in FIG. 5C. In addition, as represented in FIGS. 5A, 5B, and 5C, each of the first and second processes is performed in the time period from a time when the driver of a vehicle provided with an internal combustion engine turns off the ignition key to a time when the internal combustion engine stops its rotation or after the rotation has been stopped; the third process is performed in the time period from a time when after the internal combustion engine has stopped its rotation, the driver turns on the ignition key to a time when the internal combustion engine starts; based on the result of a determination in the third process, it is diagnosed whether or not a failure exists in the fuel-evaporation-gas purging system.

In the failure diagnosis apparatus and failure diagnosis method for a fuel-evaporation-gas purging system according to Embodiment 1, because a negative pressure produced in the intake pipe is secured in the time period from a time when the driver turns off the ignition key to a time when the internal combustion engine stops its rotation, pressure accumulation can be performed without providing any effect to the control of the internal combustion engine and without providing any superfluous apparatus such as an electric pump; thus, it is made possible to obtain a low-cost and small-size failure diagnosis apparatus and eventually to realize cost-saving and downsizing of a vehicle.

Moreover, because the pressure in the fuel-evaporation-gas path is ascertained in the time period from a time of on-operation of the ignition key to a time when the internal combustion engine starts, it is made possible to diagnose a failure without providing any effect to the control of the internal combustion engine.

Furthermore, because the failure diagnosis logic is operated in the time period from OFF-operation of the ignition key of the internal combustion engine to a time when the rotation of the internal combustion engine stops and in the time period from ON-operation of the ignition key to a time when the internal combustion engine starts, it can be expected that in comparison with a conventional apparatus, the effect to the control logic for the internal combustion engine is reduced and hence the maintainability of the control program is raised.

Still moreover, because in the variant example of Embodiment 1, the third accumulation-pressure control valve and the fourth accumulation-pressure control valve in the pressure introduction apparatus are arranged around the evaporation valve in a concentrated manner, cost-saving and downsizing can be realized.

Embodiment 2

Next, the operation and the failure diagnosis method of a failure diagnosis apparatus for a fuel-evaporation-gas purging system according to Embodiment 2 will be explained. The configuration of the failure diagnosis apparatus for a fuel-evaporation-gas purging system according to Embodiment 2 is the same as that according to Embodiment 1 in FIG. 1. In addition, it may be allowed to adopt a configuration the same as that of the variant example of Embodiment 1 in FIG. 4.

Figure 6A:
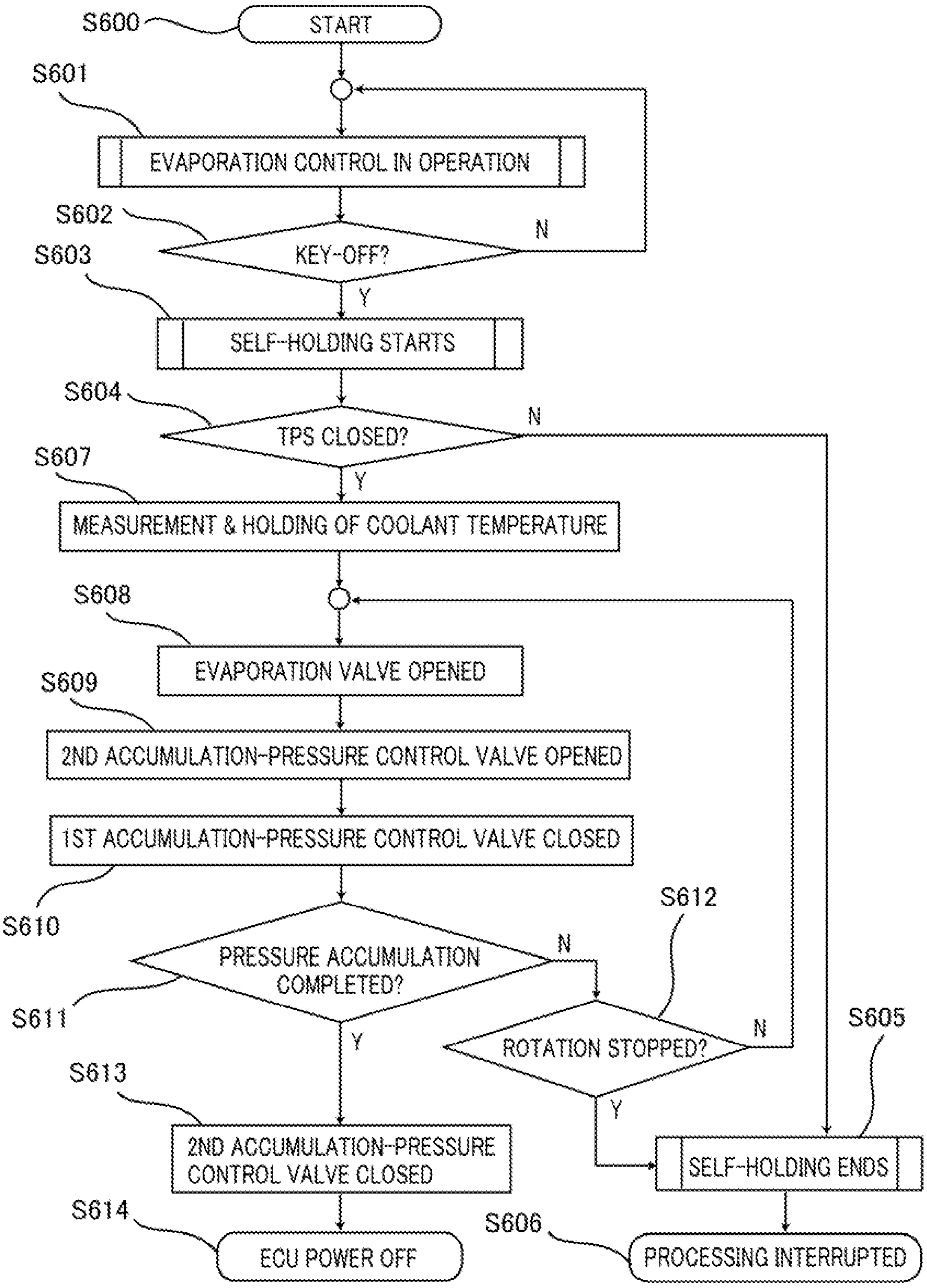
FIG. 6A is a flowchart representing part of the procedure of operation and a failure diagnosis method of a failure diagnosis apparatus for a fuel-evaporation-gas purging system according to Embodiment 2.
Figure 6B:
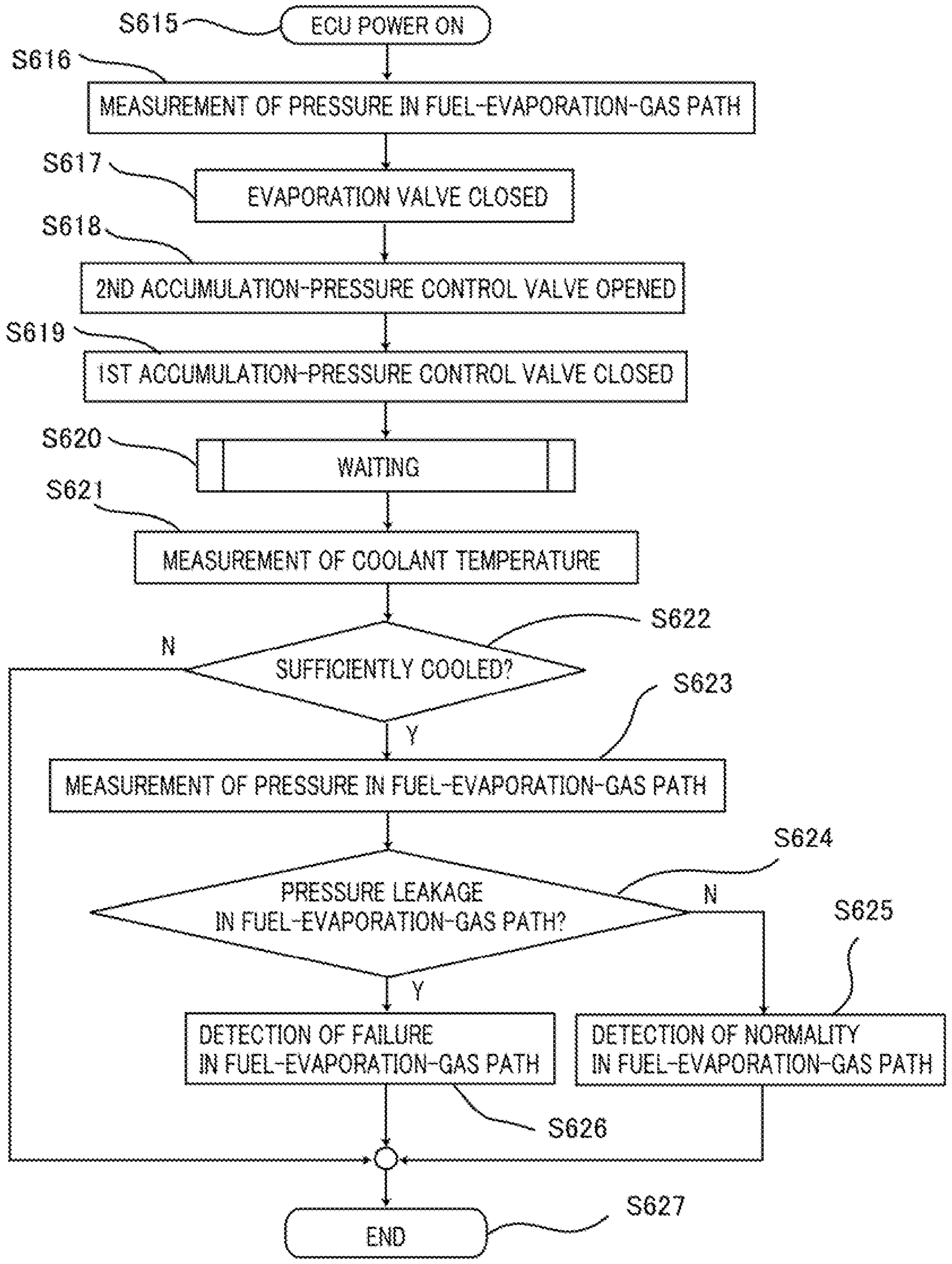
FIG. 6B is a flowchart representing the operation and the procedure following those in FIG. 6A.

Hereinafter, the operation and the failure diagnosis method of the failure diagnosis apparatus for a fuel-evaporation-gas purging system according to Embodiment 2 will be explained. FIG. 6A is a flowchart representing part of the procedure of the operation and failure diagnosis method of the failure diagnosis apparatus for a fuel-evaporation-gas purging system according to Embodiment 2; FIG. 6B is a flowchart representing the operation and the procedure following those in FIG. 6A. In FIGS. 1, 6A, and 6B, the internal combustion engine 2 is operated, and the control unit 1, as a failure diagnosis apparatus, starts its operation in the step S600; it is determine in the step S602 whether or not a vehicle driver has turned off the ignition key of the vehicle; in the case where the driver has not turned off the ignition key (N), normal control of the fuel-evaporation-gas purging system is performed in the step S601, while the internal combustion engine is operated; in the case where the driver has turned off the ignition key (Y), the step S602 is followed by the step S603, where the control unit 1, as the failure diagnosis apparatus, starts its operation.

In the step S601, normal evaporation control of the fuel-evaporation-gas purging system is performed when the internal combustion engine 2 is being operated; however, because specifically, the normal evaporation control is the same as that in Embodiment 1, described in the step S501 in FIG. 5A, the explanation therefor will be omitted.

Next, in the case where it is determined in the step S602 that the driver has turned off the ignition key (Y), the step S602 is followed by the step S603. In the step S603, until required process to be executed after the key-off operation is completed, the control unit 1 performs self-holding of the power source therefor; then, the step S603 is followed by the step S604.

In the step S604, based on an output signal from the throttle position sensor at a time of the key-off operation, the control unit 1 determines whether or not the throttle valve 3 is closed; in the case where the throttle valve 3 is not closed (N), no negative pressure in the intake pipe 5 can be secured and hence the step S604 is followed by the step S605, where the control unit 1 ends the self-holding of the power source; then, in the step S606, the control unit 1 interrupts the process to be performed by the failure diagnosis apparatus for a fuel-evaporation-gas purging system.

In the case where it is determined in the step S604 in FIG. 6A that the throttle valve 3 is closed (Y), the step S604 is followed by the step S607, where the control unit 1 measures the coolant temperature of the internal combustion engine 2 and then holds it in the memory. Next, the control unit 1 opens the evaporation valve 17 in the step S608, opens the second accumulation-pressure control valve 162 in the step S609, and closes the first accumulation-pressure control valve 161 in the step S610. As a result, the intake pipe 5 and the accumulator 18 communicate with each other by way of the evaporation valve 17, the purge line 152, and the second accumulation-pressure control valve 162, and the intake pipe 5 is disconnected from the canister 11 by the first accumulation-pressure control valve 161. Accordingly, the negative pressure in the intake pipe 5 is introduced into the accumulator 18.

After the step S610 is completed, the negative pressure in the intake pipe 5, as the intake system of the internal combustion engine 2, is introduced into the accumulator 18 and the accumulation pressure line 19 included in the pressure introduction apparatus and into the purge line 152 of the fuel-evaporation-gas purging system, in the time period from a time when the vehicle driver turns off the ignition key to a time when the internal combustion engine 2 stops its rotation; then, the accumulator 18 accumulates the introduced negative pressure. The state in this situation is the same as that represented in foregoing FIG. 2.

Next, in the step S611 following the step S610, the control unit 1 determines whether or not the pressure accumulation in the accumulator 18 of the pressure introduction apparatus has been completed. The determination in the step S611 is performed based on a detection value of the pressure in the accumulator 18, detected by the pressure sensor 20 provided in the accumulator 18; in the case where the detection value is a low pressure the same as or lower than a predetermined value, it is determined that the pressure accumulation has been completed (Y), and then the step S611 is followed by the step S613; in the case where the detection value of the pressure sensor 20 is not a low pressure the same as or lower than the predetermined value, it is determined that the pressure accumulation has not been completed (N), and then the step S611 is followed by the step S612.

In the step S612 following the step S611, the control unit 1 determines whether or not the internal combustion engine 2 has stopped its rotation; in the case where the internal combustion engine 2 has stopped its rotation (Y), it is suggested that before the pressure accumulation in the accumulator 18 has been completed, the internal combustion engine 2 has stopped its rotation, and hence the predetermined negative pressure can no longer be secured; therefore, the step S612 is followed by the step S605, where the self-holding of the power source by the control unit 1 is ended so that power-source supply to the control unit 1 is cut off; then, in the step S606, the processing to be performed by the failure diagnosis apparatus is ended.

In the case where it is determined in the step S612 that the internal combustion engine 2 has not stopped its rotation (N), the step S612 is followed by the step S608 and then the foregoing pressure accumulation operation and the ascertainment of the pressure accumulation by the pressure sensor 20 are repeated.

When it is determined in the step S611 that the pressure accumulation has been completed (Y) and then the step S611 is followed by the step S613, the control unit 1 closes the second accumulation-pressure control valve 162; then, in the step S614, the power source for the control unit 1 is cut off so that the processing is ended. After that, the rotation of the internal combustion engine 2 stops, i.e., the internal combustion engine 2 stops. The supply of the power source to the control unit 1 is cut off, based on the condition that the evaporation valve 17 is opened and that each of the first accumulation-pressure control valve 161 and the second accumulation-pressure control valve 162 is closed.

Next, the failure diagnosis apparatus for a fuel-evaporation-gas purging system according to Embodiment 2 proceeds to the operation represented in FIG. 6B. The operation represented in FIG. 6B is performed in the time period from a time when the vehicle driver turns on the ignition key to a time when the internal combustion engine 2 starts. In the step S615 in FIG. 6B, the vehicle driver turns on the ignition key, so that the control unit 1 is supplied with the power source. In the step S616, the control unit 1 measures the pressure in the fuel-evaporation-gas path by use of the pressure sensor 20 and then stores the measurement value in the memory.

Next, the control unit 1 closes the evaporation valve 17 in the step S617; then, in the step S618, the control unit 1 opens the second accumulation-pressure control valve 162; furthermore, in the step S619, the control unit 1 opens the first accumulation-pressure control valve 161. The operation in the steps S617 through S619 corresponds to pressure changing operation in which the pressure in the fuel-evaporation-gas path is changed to the negative pressure Pn accumulated in the accumulator 18.

Next, in the step S620, the control unit 1 waits for a predetermined time until the pressure in the fuel-evaporation-gas path stabilizes. After that, the control unit 1 measures the coolant temperature of the internal combustion engine 2 in the step S621 and then determines in the step S622 whether or not the internal combustion engine 2 has sufficiently been cooled. This determination is performed based on the measured coolant temperature of the internal combustion engine 2.

In the case where it is determined in the step S622 that the internal combustion engine 2 has not sufficiently been cooled (N), the step S622 is followed by the step S627, where the processing is ended; in the case where it is determined in the step S622 that the internal combustion engine 2 has sufficiently been cooled (Y), the following determination on whether or not a failure exists is performed. In this situation, the time in which the internal combustion engine is sufficiently cooled means, for example, a time in which the pressure in the fuel-evaporation-gas path stabilizes.

In the step S623, the control unit 1 measures the pressure in the fuel-evaporation-gas path by use of the pressure sensor 20; then, the step S623 is followed by the step S624. In the step S624, the control unit 1 compares the value of the pressure in the fuel-evaporation-gas path, which has been measured in the foregoing step S616 and has been stored in the memory, with the pressure measurement value obtained by the present measurement so as to determine whether or not pressure leakage exists in the fuel-evaporation-gas path.

When it is determined in the step S624 that the present measurement value obtained in the step S623 has changed from the measurement value that had been stored in the step S616, the control unit 1 determines that pressure leakage exists in the fuel-evaporation-gas path, i.e., gas leakage of the fuel evaporation gas exists (Y); then, in the step S626, the control unit 1 diagnoses that a failure exists in the fuel-evaporation-gas path, i.e., that a failure exists in the fuel-evaporation-gas purging system; then, in the step S627, the control unit 1, as the failure diagnosis apparatus, ends its operation. After the completion of the determination, the valve for the accumulator 18 is closed, so that the evaporation path is returned to the normal one.

In contrast, when it is determined in the step S624 that the present measurement value obtained in the step S623 has not changed from the measurement value that had been stored in the step S616, the control unit 1 determines that pressure leakage does not exist in the fuel-evaporation-gas path (N); then, in the step S625, the control unit 1 diagnoses that no failure exists in the fuel-evaporation-gas path, i.e., that no failure exists in the fuel-evaporation-gas purging system; then, in the step S627, the control unit 1, as the failure diagnosis apparatus, ends its operation. After the completion of the determination, the valve for the accumulator 18 is closed, so that the evaporation path is returned to the normal one.

In the determination on pressure leakage in the step S624, with regard to a value of the difference between the measurement value that had been stored in the step S616 and the present measurement value in the step S623, with which or larger, it is determined that pressure leakage exists in the fuel-evaporation-gas path, i.e., with regard to which value should be the determination threshold value, it is only necessary to appropriately perform setting while considering the practical diagnosis accuracy of the failure diagnosis apparatus.

The foregoing failure diagnosis apparatus and failure diagnosis method for a fuel-evaporation-gas purging system according to Embodiment 2 are reductions to practice of the failure diagnosis apparatus for a fuel-evaporation-gas purging system according to any one of claims 9 through 13, 16, and 17 and the failure diagnosis method for a fuel-evaporation-gas purging system according to claim 19.

In the failure diagnosis method for the fuel-evaporation-gas purging system according to claim 12, the first process corresponds to the processing in the steps S608 through S610 in FIG. 6A; the second process corresponds to the processing in the steps S617 through S619 in FIG. 6B; the third process corresponds to the processing in the steps S623 through S626 in FIG. 6B. As represented in FIGS. 6A and 6B, the first process is performed in the time period from a time when the driver of a vehicle provided with an internal combustion engine turns off the ignition key to a time when the internal combustion engine stops its rotation; each of the second process and the third process is performed in the time period from a time when the vehicle driver again turns on the ignition key after the internal combustion engine has stopped its rotation to a time when the internal combustion engine starts; based on the result of a determination in the third process, it is diagnosed whether or not a failure exists in the fuel-evaporation-gas purging system.

In the failure diagnosis apparatus and failure diagnosis method for a fuel-evaporation-gas purging system according to Embodiment 2, because a negative pressure produced in the intake pipe is secured in the time period from a time when the driver turns off the ignition key to a time when the internal combustion engine stops its rotation, pressure accumulation can be performed without providing any effect to the control of the internal combustion engine and without providing any superfluous apparatus such as an electric pump; thus, it is made possible to obtain a low-cost and small-size failure diagnosis apparatus and eventually to realize cost-saving and downsizing of a vehicle.

Moreover, because the pressure in the fuel-evaporation-gas path is ascertained in the time period from a time of on-operation of the ignition key to a time when the internal combustion engine starts, it is made possible to diagnose a failure without providing any effect to the control of the internal combustion engine.

Furthermore, because the failure diagnosis logic is operated in the time period from OFF-operation of the ignition key of the internal combustion engine to a time when the rotation of the internal combustion engine stops and in the time period from ON-operation of the ignition key to a time when the internal combustion engine starts, it can be expected that in comparison with a conventional apparatus, the effect to the control logic for the internal combustion engine is reduced and hence the maintainability of the control program is raised.

Embodiment 3

Next, the operation and the failure diagnosis method of a failure diagnosis apparatus for a fuel-evaporation-gas purging system according to Embodiment 3 will be explained. The configuration of the failure diagnosis apparatus for a fuel-evaporation-gas purging system according to Embodiment 3 corresponds to the one obtained by removing the first accumulation-pressure control valve 161 from the constituent elements of Embodiment 1 in FIG. 1 and leaving the second accumulation-pressure control valve 162; in Embodiment 3, a valve corresponding to the second accumulation-pressure control valve in Embodiment 1 will be referred to as a fifth accumulation-pressure control valve. The other configurations are the same as those in Embodiment 1.

In addition, it may be allowed that as a variant example of Embodiment 3, a configuration the same as that of the variant example of Embodiment 1 in FIG. 4. In this case, the third accumulation-pressure control valve 163 in FIG. 4 is removed and the fourth accumulation-pressure control valve 164 is left; in Embodiment 3, a valve corresponding to the fourth accumulation-pressure control valve 164 will be referred to as a sixth accumulation-pressure control valve.

Figure 7A:
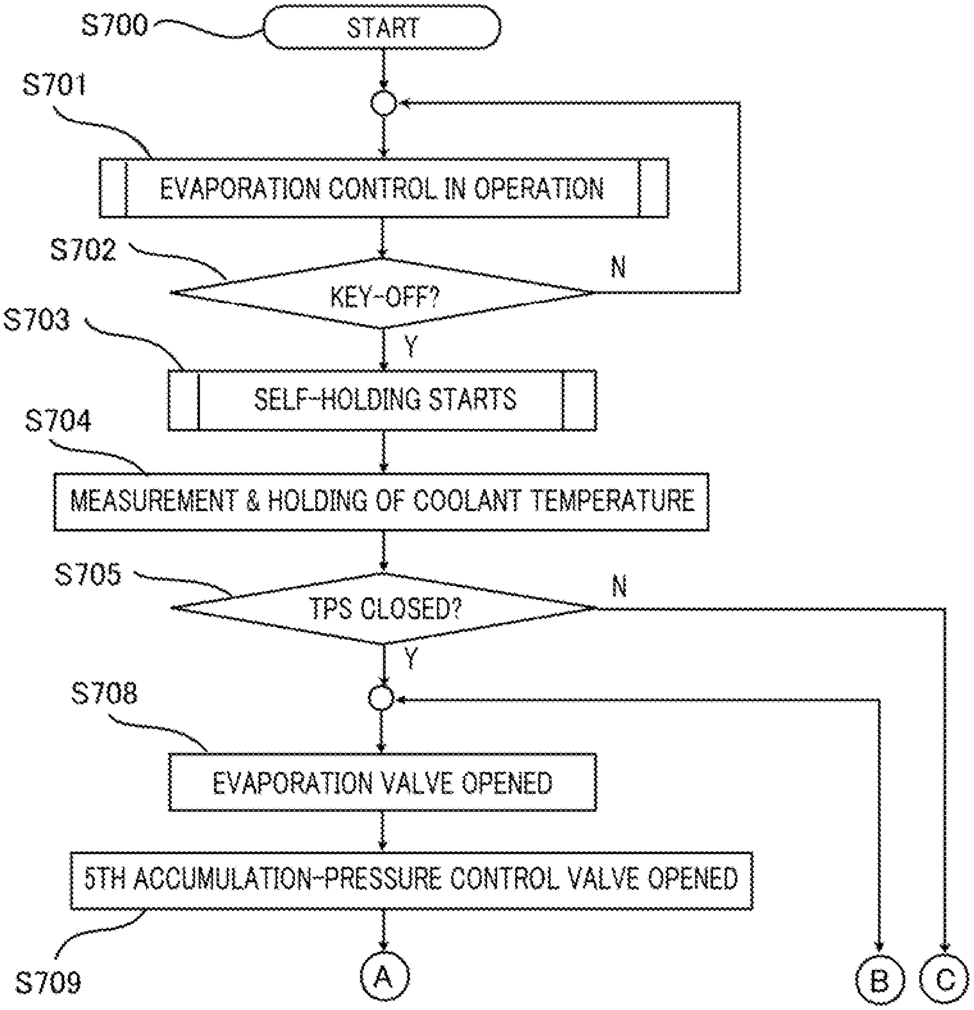
FIG. 7A is a flowchart representing part of the procedure of operation and a failure diagnosis method of a failure diagnosis apparatus for a fuel-evaporation-gas purging system according to Embodiment 3.
Figure 7B:
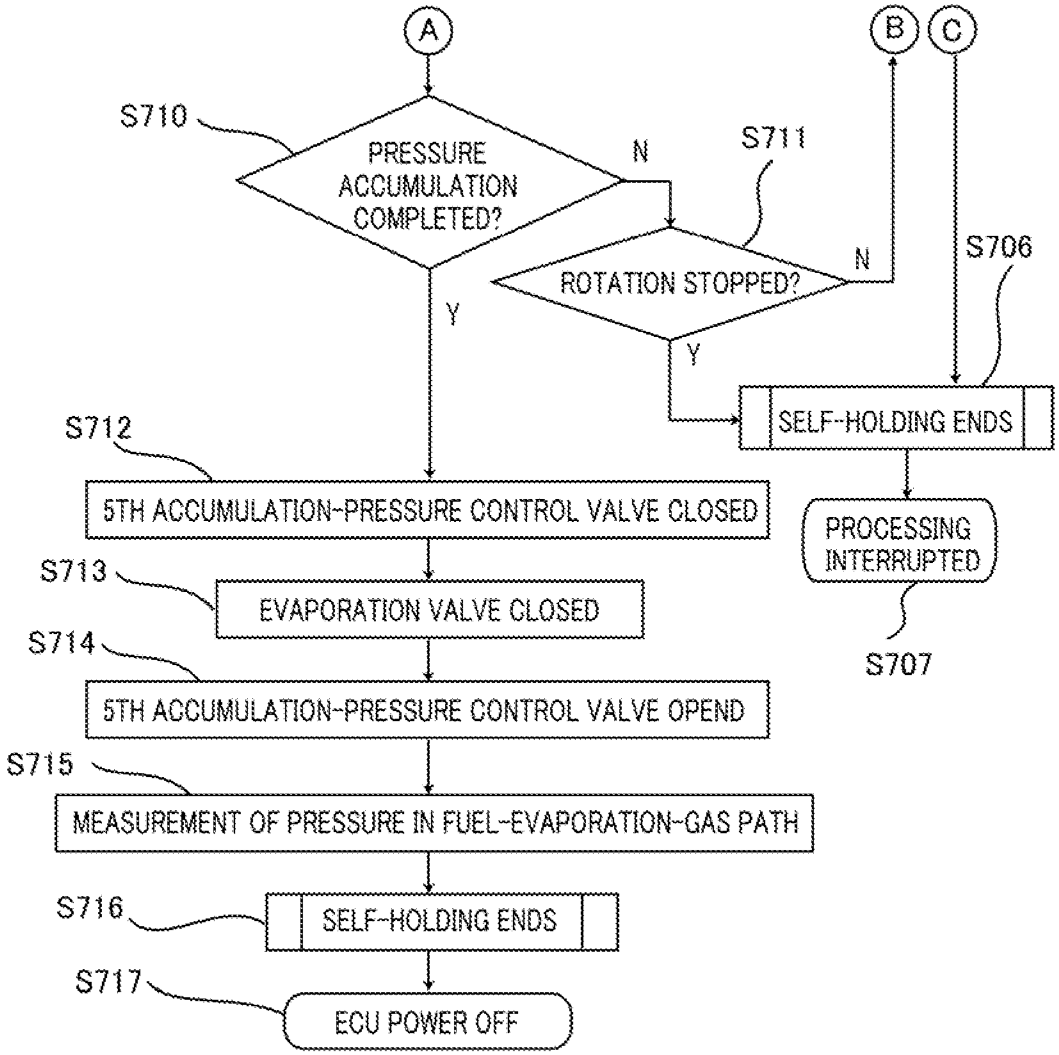
FIG. 7B is a flowchart representing the operation and the procedure following those in FIG. 7A.
Figure 7C:
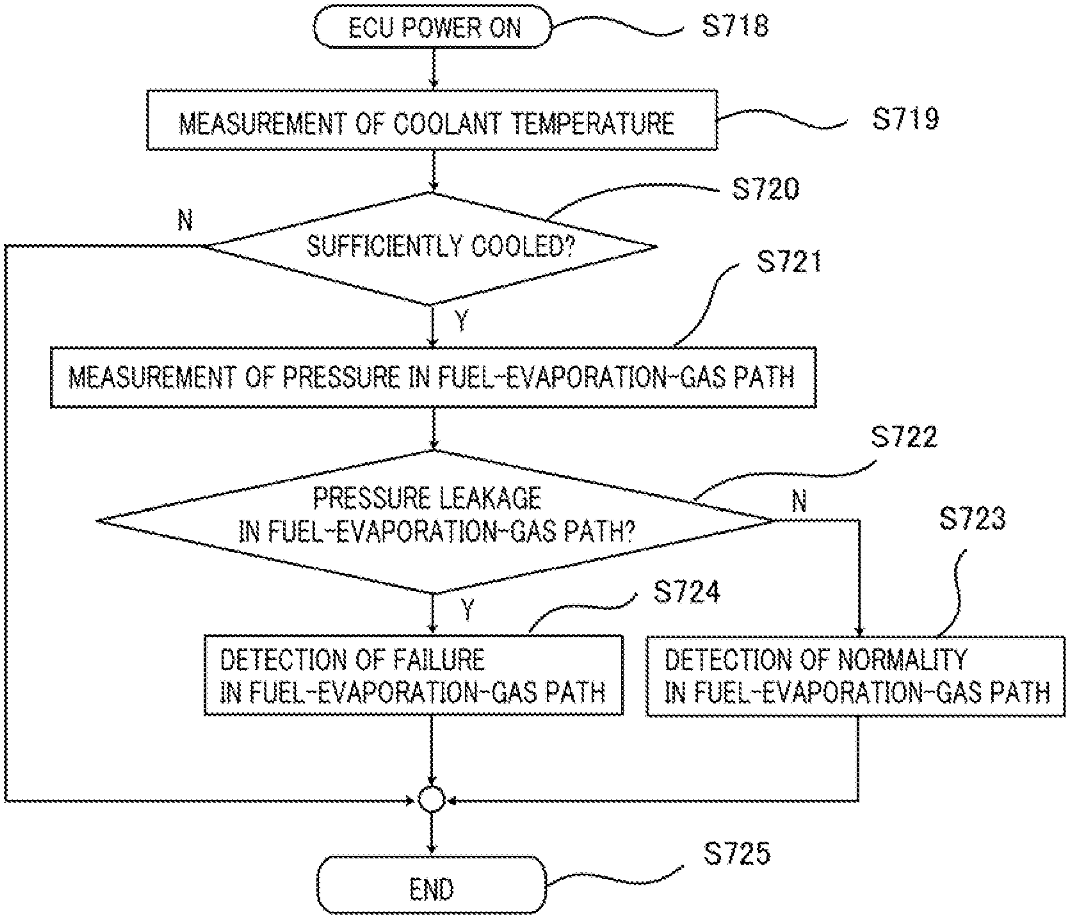
FIG. 7C is a flowchart representing the operation and the procedure to be executed after the operation and the procedure represented in FIG. 7B.
Figure 8:
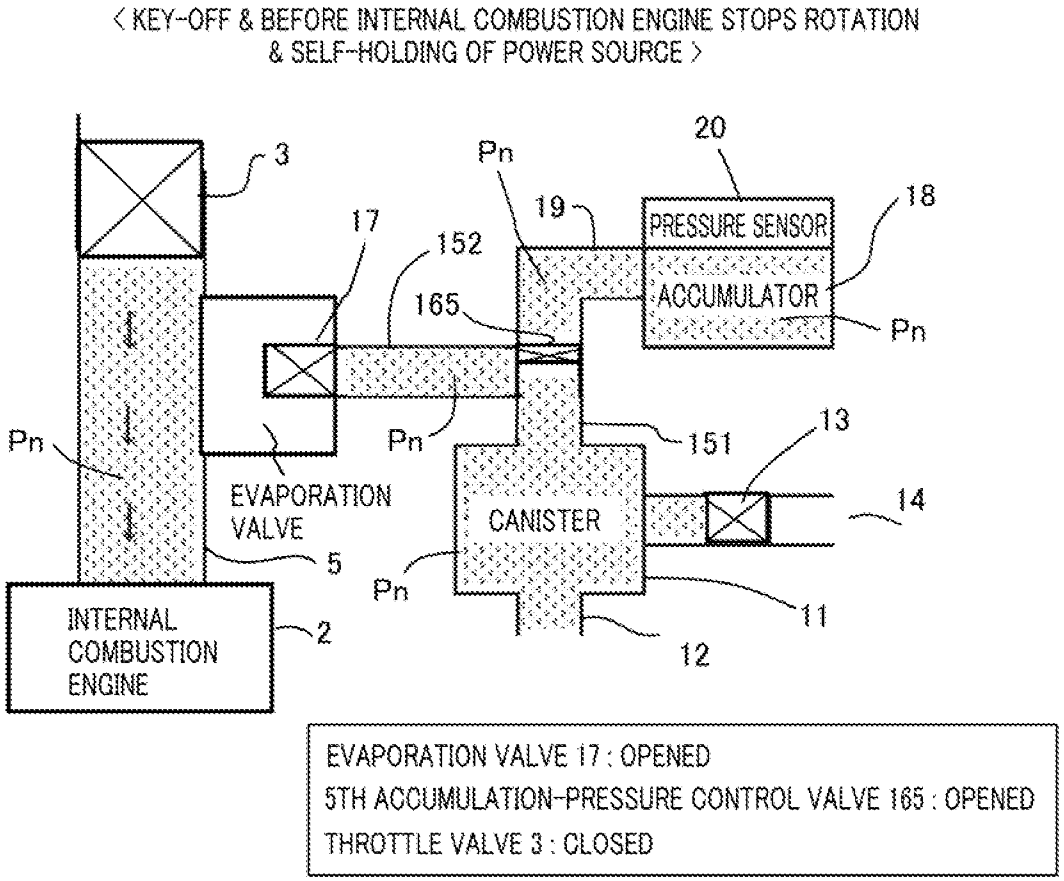
FIG. 8 is an explanatory diagram for explaining a specific operation stage in the procedure of the operation and the failure diagnosis method of the failure diagnosis apparatus for a fuel-evaporation-gas purging system according to Embodiment 3.
Figure 9:
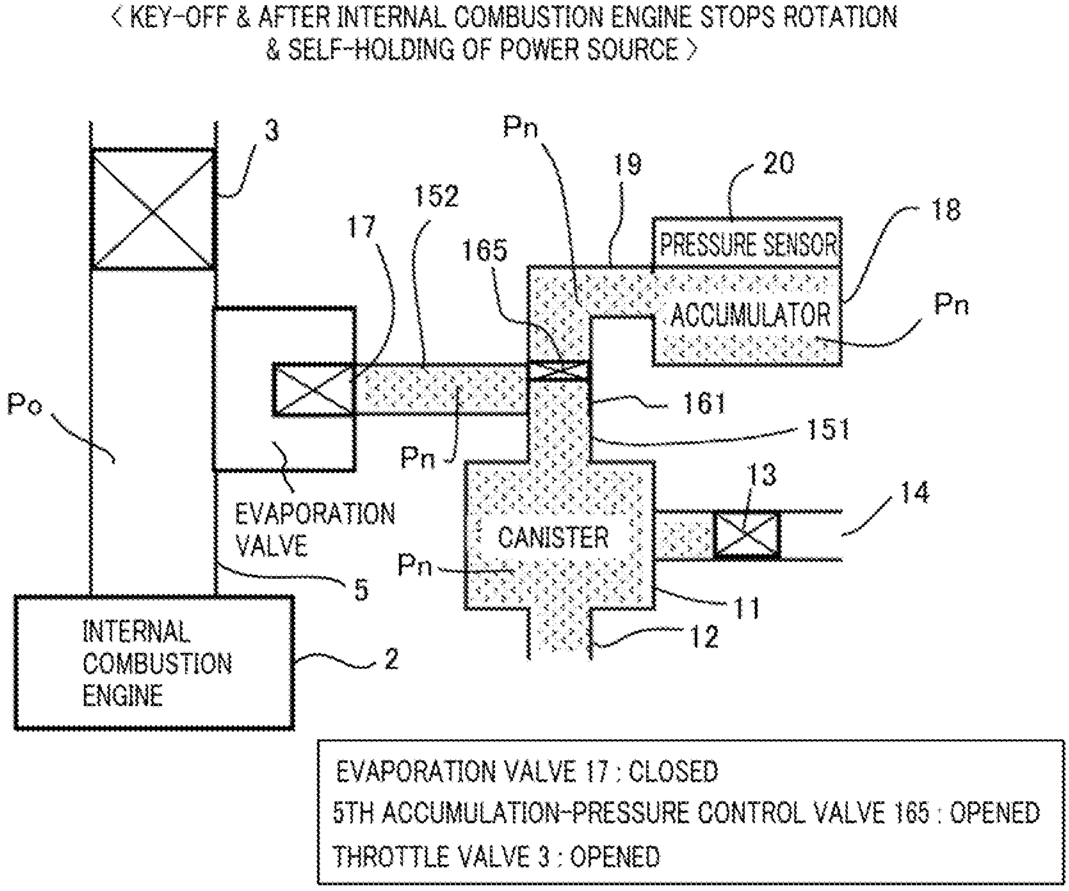
FIG. 9 is an explanatory diagram for explaining a specific operation stage, which is different from the operation stage in FIG. 8, in the procedure of the operation and the failure diagnosis method of the failure diagnosis apparatus fora fuel-evaporation-gas purging system according to Embodiment 3.

Hereinafter, the operation and the failure diagnosis method of the failure diagnosis apparatus for a fuel-evaporation-gas purging system according to Embodiment 3 will be explained. FIG. 7A is a flowchart representing part of the procedure of the operation and failure diagnosis method of the failure diagnosis apparatus for a fuel-evaporation-gas purging system according to Embodiment 3; FIG. 7B is a flowchart representing the operation following that in FIG. 7A; FIG. 7C is a flowchart representing the operation and the procedure to be executed after the operation and the procedure represented in FIG. 7B. FIG. 8 is an explanatory diagram for explaining a specific operation stage in the procedure of the operation and the failure diagnosis method of the failure diagnosis apparatus for a fuel-evaporation-gas purging system according to Embodiment 3; FIG. 9 is an explanatory diagram for explaining a specific operation stage, which is different from the operation stage in FIG. 8, in the procedure of the operation and the failure diagnosis method of the failure diagnosis apparatus for a fuel-evaporation-gas purging system according to Embodiment 3.

In FIGS. 7A, 7B, 7C, and 8, the internal combustion engine 2 is operated, and the control unit 1 (unrepresented in FIG. 8, refer to FIG. 1), as a failure diagnosis apparatus, starts its operation in the step S700; it is determine in the step S702 whether or not a vehicle driver has turned off the ignition key of the vehicle; in the case where the driver has not turned off the ignition key (N), normal control of the fuel-evaporation-gas purging system is performed in the step S701, while the internal combustion engine is operated; in the case where the driver has turned off the ignition key (Y), the step S702 is followed by the step S703, where the control unit 1, as the failure diagnosis apparatus, starts its operation.

In the step S701, there is performed normal evaporation control in the fuel-evaporation-gas purging system while the internal combustion engine 2 is operated; however, the explanation for the specific control, which has been described in Embodiment 1, will be omitted here.

Next, in the case where it is determined in the step S702 that the driver has turned off the ignition key (Y), the step S702 is followed by the step S703. In the step S703, until required process to be executed after the key-off operation is completed, the control unit 1 performs self-holding of the power source therefor; then, the step S703 is followed by the step S704.

In the step S704, the control unit 1 measures the coolant temperature of the internal combustion engine 2 and then stores the measurement value in the memory; then, in the step S705, based on an output signal from the throttle position sensor at a time of the key-off operation, the control unit 1 determines whether or not the throttle valve 3 is closed. In the case where it is determined that the throttle valve 3 is not closed (N), no negative pressure in the intake pipe 5 can be secured, and hence the step S705 is followed by the step S706 in FIG. 7B by way of the node C in FIG. 7A and the node C in FIG. 7B; in the step S706, the control unit 1 ends the self-holding of the power source; then, in the step S706, the control unit 1 interrupts the process to be performed by the failure diagnosis apparatus for a fuel-evaporation-gas purging system.

In the case where it is determined in the step S705 in FIG. 7A that the throttle valve 3 is closed (Y), the step S705 is followed by the step S708, where the control unit 1 opens the evaporation valve 17; then, in the step S709, the control unit 1 opens a fifth accumulation-pressure control valve 165. As a result, the intake pipe 5 and the accumulator 18 communicate with each other by way of the evaporation valve 17, the purge line 152, and the fifth accumulation-pressure control valve 165, and the negative pressure in the intake pipe 5 is introduced into the accumulator 18.

After the step S709 is completed, the negative pressure in the intake pipe 5, as the intake system of the internal combustion engine 2, is introduced into the accumulator 18 and the accumulation pressure line 19 included in the pressure introduction apparatus and into the purge line 152 of the fuel-evaporation-gas purging system, in the time period from a time when the vehicle driver turns off the ignition key to a time when the internal combustion engine 2 stops its rotation; then, the accumulator 18 accumulates the introduced negative pressure.

FIG. 8 represents the state where after the step S709 has been completed, the accumulator 18 accumulates the negative pressure from the intake pipe 5. Pn in FIG. 8 indicates the area of the negative pressure. In the state represented in FIG. 8, the evaporation valve 17 is opened, the fifth accumulation-pressure control valve 165 is opened, and the throttle valve 3 is closed.

Next, the step S709 is followed by the step S710 by way of the node A in FIG. 7A and the node A in FIG. 7B; then, in the step S710, the control unit 1 determines whether or not the pressure accumulation in the accumulator 18 of the pressure introduction apparatus has been completed. The determination in the step S710 is performed based on a detection value of the pressure in the accumulator 18, detected by the pressure sensor 20 provided in the accumulator 18; in the case where the detection value is a low pressure the same as or lower than a predetermined value, it is determined that the pressure accumulation has been completed (Y), and then the step S710 is followed by the step S712; in the case where the detection value of the pressure sensor 20 is not a low pressure the same as or lower than the predetermined value, it is determined that the pressure accumulation has not been completed (N), and then the step S710 is followed by the step S711.

In the step S711 following the step S710, the control unit 1 determines whether or not the internal combustion engine 2 has stopped its rotation; in the case where the internal combustion engine 2 has stopped its rotation (Y), it is suggested that before the pressure accumulation in the accumulator 18 has been completed, the internal combustion engine 2 has stopped its rotation, and hence the predetermined negative pressure can no longer be secured; therefore, the step S711 is followed by the step S706, where the self-holding of the power source by the control unit 1 is ended so that power-source supply to the control unit 1 is cut off; then, in the step S707, the processing to be performed by the failure diagnosis apparatus is ended.

In the case where it is determined in the step S711 that the internal combustion engine 2 has not stopped its rotation (N), the step S711 is followed by the step S708 in FIG. 7A by way of the node B in FIG. 7B and the node B in FIG. 7A; then, the foregoing pressure accumulation operation is repeated.

When it is determined in the step S710 that the pressure accumulation has been completed (Y) and then the step S710 is followed by the step S712, the control unit 1 closes the fifth accumulation-pressure control valve 165; then, in the step S713, the control unit 1 closes the evaporation valve 17 so as to disconnect the purge line 152 from the intake pipe 5. Next, in the step S714, the control unit 1 again opens the fifth accumulation-pressure control valve 165. The operation in the steps S713 through S714 corresponds to pressure changing operation in which the pressure in the fuel-evaporation-gas path is changed to the negative pressure Pn accumulated in the accumulator 18.

FIG. 9 represents the state where the accumulated negative pressure has been introduced from the accumulator 18 into the fuel-evaporation-gas path. Pn in FIG. 9 indicates the area of the negative pressure. In the state represented in FIG. 9, the evaporation valve 17 is closed, the fifth accumulation-pressure control valve 165 is opened, and the throttle valve 3 is opened. At this stage, the internal combustion engine 2 has stopped its rotation. In addition, it may be allowed that the internal combustion engine 2 does not stop its rotation.

After the pressure in the fuel-evaporation-gas path has been changed in such a manner as described above, the control unit 1 measures, in the step S715, the pressure in the fuel-evaporation-gas path by use of the pressure sensor 20 and then stores the measurement value in the memory so as to complete the preparation for the failure diagnosis. After the preparation for the failure diagnosis has been completed in the step S715, the control unit 1 cancels the self-holding of the power source in the step S716, so that in the step S717, supply of the power source is cut off. The supply of the power source to the control unit 1 is cut off, based on the condition that the evaporation valve 17 is closed and the fifth accumulation-pressure control valve 165 is opened.

The internal combustion engine 2 stops its rotation at any of timings in the steps S712 through S717 after the completion of the pressure accumulation. The operation in the steps S712 through S714 is the one in which the accumulated negative pressure is introduced into the fuel-evaporation-gas path; the operation ends before the internal combustion engine 2 stops its rotation or after the internal combustion engine 2 stops its rotation.

Next, the failure diagnosis apparatus for a fuel-evaporation-gas purging system according to Embodiment 3 proceeds to the operation represented in FIG. 7C. The operation represented in FIG. 7C is performed in the time period from a time when the vehicle driver turns on the ignition key to a time when the internal combustion engine 2 starts. In FIG. 7C, in the step S718, the driver turns on the ignition key so as to start the internal combustion engine 2 that is at a standstill. As a result, the control unit 1 is supplied with the power source by the battery 21.

Immediately after being supplied with the power source, the control unit 1 measures the coolant temperature of the internal combustion engine 2 in the step S719; then, in the step S720, the control unit 1 determines whether or not the internal combustion engine 2 has sufficiently been cooled. In the case where it is determined in the step S720 that the internal combustion engine 2 has not sufficiently been cooled (N), the step S720 is followed by the step S725, where the processing is ended; in the case where it is determined in the step S720 that the internal combustion engine 2 has sufficiently been cooled (Y), the following determination on whether or not a failure exists is performed.

In the step S721, the control unit 1 measures the pressure in the fuel-evaporation-gas path by use of the pressure sensor 20; then, the step S721 is followed by the step S722. In the step S722, the control unit 1 compares the value of the pressure in the fuel-evaporation-gas path, which has been measured in the foregoing step S715 and has been stored in the memory, with the pressure measurement value obtained by the present measurement so as to determine whether or not pressure leakage exists in the fuel-evaporation-gas path.

When it is determined in the step S722 that the present measurement value obtained in the step S721 has changed from the measurement value that had been stored in the step S715, the control unit 1 determines that pressure leakage exists in the fuel-evaporation-gas path, i.e., gas leakage of the fuel evaporation gas exists (Y); then, in the step S724, the control unit 1 diagnoses that a failure exists in the fuel-evaporation-gas path, i.e., that a failure exists in the fuel-evaporation-gas purging system; then, in the step S725, the control unit 1, as the failure diagnosis apparatus, ends its operation. After the completion of the determination, the valve for the accumulator 18 is closed, so that the evaporation path is returned to the normal one.

In contrast, when it is determined in the step S722 that the present measurement value obtained in the step S721 has not changed from the measurement value that had been stored in the step S715, the control unit 1 determines that pressure leakage does not exist in the fuel-evaporation-gas path (N); then, in the step S723, the control unit 1 diagnoses that no failure exists in the fuel-evaporation-gas path, i.e., that no failure exists in the fuel-evaporation-gas purging system; then, in the step S725, the control unit 1, as the failure diagnosis apparatus, ends its operation. After the completion of the determination, the valve for the accumulator 18 is closed, so that the evaporation path is returned to the normal one.

In the determination on pressure leakage in the step S722, with regard to a value of the difference between the measurement value that had been stored in the step S715 and the present measurement value in the step S721, with which or larger, it is determined that pressure leakage exists in the fuel-evaporation-gas path, i.e., with regard to which value should be the determination threshold value, it is only necessary to appropriately perform setting while considering the practical diagnosis accuracy of the failure diagnosis apparatus.

In addition, in the failure diagnosis apparatus for a fuel-evaporation-gas purging system according to Embodiment 3, it may be allowed that a negative pressure in the intake system of an internal combustion engine is introduced and pressure accumulation is completed in the time period from a time when the driver of a vehicle provided with the internal combustion engine turns off the ignition key to a time when the internal combustion engine stops its rotation and that the accumulated negative pressure is introduced into the fuel-evaporation-gas path in the time period from a time when the driver turns on the ignition key after the internal combustion engine has stopped the foregoing rotation to a time when the internal combustion engine starts and then it is determined whether or not there exist a change in the pressure in the fuel-evaporation-gas path into which the negative pressure has been introduced.

The foregoing failure diagnosis apparatus and failure diagnosis method for a fuel-evaporation-gas purging system according to Embodiment 3 are reductions to practice of the failure diagnosis apparatus for a fuel-evaporation-gas purging system according to any one of claims 1 through 3, 6 through 11, and 14 through 16 and the failure diagnosis method for a fuel-evaporation-gas purging system according to claim 18.

In the failure diagnosis method for the fuel-evaporation-gas purging system according to any one of claims 18 and 19, the first process corresponds to the processing in the steps S708 through S709 in FIG. 7A; the second process corresponds to the processing in the steps S713 through S714 in FIG. 7B; the third process corresponds to the processing in the steps S721 through S724 in FIG. 7C.

In the failure diagnosis apparatus for a fuel-evaporation-gas purging system according to Embodiment 3, because the accumulation-pressure control valve is simplified, downsizing and cost-saving of the apparatus can be realized.

Moreover, because a negative pressure produced in the intake pipe is secured in the time period from a time when the driver turns off the ignition key to a time when the internal combustion engine stops its rotation, pressure accumulation can be performed without providing any effect to the control of the internal combustion engine and without providing any superfluous apparatus such as an electric pump; thus, it is made possible to obtain a low-cost and small-size failure diagnosis apparatus and eventually to realize cost-saving and downsizing of a vehicle.

Moreover, because the pressure in the fuel-evaporation-gas path is ascertained in the time period from a time of on-operation of the ignition key to a time when the internal combustion engine starts, it is made possible to diagnose a failure without providing any effect to the control of the internal combustion engine.

Furthermore, because the failure diagnosis logic is operated in the time period from OFF-operation of the ignition key of the internal combustion engine to a time when the rotation of the internal combustion engine stops and in the time period from ON-operation of the ignition key to a time when the internal combustion engine starts, it can be expected that in comparison with a conventional apparatus, the effect to the control logic for the internal combustion engine is reduced and hence the maintainability of the control program is raised.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present application. For example, there are included the case where at least one constituent element is modified, added, or omitted and the case where at least one constituent element is extracted and then combined with constituent elements of other embodiments.

Hereinafter, respective features disclosed in the present disclosure will collectively be described as appendixes.

(Appendix 1) A failure diagnosis apparatus that diagnoses whether or not a failure exists in a fuel-evaporation-gas purging system in which a fuel evaporation gas produced in a fuel tank is absorbed by an absorbent provided in a canister and in which a fuel evaporation gas absorbed by the absorbent is purged so as to be radiated into an intake system of an internal combustion engine, the failure diagnosis apparatus comprising:

a pressure introduction apparatus that introduces an accumulated pressure into a fuel-evaporation-gas path through which the fuel evaporation gas flows;

a determination apparatus that determines whether or not leakage of a fuel evaporation gas exists in the fuel-evaporation-gas path, based on a pressure change in the fuel-evaporation-gas path; and a controller that controls at least the pressure introduction apparatus and the determination apparatus, wherein the pressure introduction apparatus is controlled by the controller in such a way as to introduce a negative pressure in the intake system of the internal combustion engine so as to perform the pressure accumulation in a time period from a time when a driver of a vehicle provided with the internal combustion engine turns off an ignition key to a time when the internal combustion engine stops its rotation and in such a way as to introduce the accumulated negative pressure into the fuel-evaporation-gas path before the internal combustion engine stops the rotation or after the internal combustion engine has stopped the rotation, wherein the determination apparatus is controlled by the controller in such a way as to determine whether or not a pressure in the fuel-evaporation-gas path into which the negative pressure had been introduced has changed in a time period from a time when after the internal combustion engine has stopped the rotation, the driver turns on the ignition key to a time when the internal combustion engine starts, and wherein the controller diagnoses whether or not a failure exists in the fuel-evaporation-gas purging system, based on a result of the determination by the determination apparatus.

(Appendix 2) A failure diagnosis apparatus that diagnoses whether or not a failure exists in a fuel-evaporation-gas purging system in which a fuel evaporation gas produced in a fuel tank is absorbed by an absorbent provided in a canister and in which a fuel evaporation gas absorbed by the absorbent is purged so as to be radiated into an intake system of an internal combustion engine, the failure diagnosis apparatus comprising:

a pressure introduction apparatus that introduces an accumulated pressure into a fuel-evaporation-gas path through which the fuel evaporation gas flows;

a determination apparatus that determines whether or not leakage of a fuel evaporation gas exists in the fuel-evaporation-gas path, based on a pressure change in the fuel-evaporation-gas path; and a controller that controls at least the pressure introduction apparatus and the determination apparatus, wherein the pressure introduction apparatus is controlled by the controller in such a way as to introduce a negative pressure in the intake system of the internal combustion engine and complete the pressure accumulation in a time period from a time when a driver of a vehicle provided with the internal combustion engine turns off an ignition key to a time when the internal combustion engine stops its rotation, wherein the pressure introduction apparatus is further controlled by the controller in such a way as to introduce the accumulated negative pressure into the fuel-evaporation-gas path in a time period from a time when after the internal combustion engine has stopped the rotation, the driver turns on the ignition key to a time when the internal combustion engine starts, wherein the determination apparatus is controlled by the controller in such a way as to determine whether or not a pressure in the fuel-evaporation-gas path into which the negative pressure had been introduced has changed in a time period from a time when the driver turns on the ignition key to a time when the internal combustion engine starts, and wherein the controller diagnoses whether or not a failure exists in the fuel-evaporation-gas purging system, based on a result of the determination by the determination apparatus.

(Appendix 3) The failure diagnosis apparatus for a fuel-evaporation-gas purging system according to any one of appendixes 1 and 2, wherein the pressure introduction apparatus is controlled by the controller in such a way as to introduce the accumulated pressure into the fuel-evaporation-gas path when the accumulated pressure is the same as or lower than a predetermined value.

(Appendix 4) The failure diagnosis apparatus for a fuel-evaporation-gas purging system according to any one of appendixes 1 through 3, wherein the determination apparatus is controlled by the controller in such a way as to perform the determination when in a process from a time when the driver turns on the ignition key to a time when the internal combustion engine starts, a difference between a coolant temperature of the internal combustion engine at a time when the internal combustion engine has most recently stopped its rotation and the coolant temperature at a time immediately prior to a present start of the internal combustion engine is larger than a predetermined value and the coolant temperature at the time immediately prior to the present start of the internal combustion engine is lower than a predetermined value.

(Appendix 5) The failure diagnosis apparatus for a fuel-evaporation-gas purging system according to any one of appendixes 1 through 4, wherein the fuel-evaporation-gas path includes the fuel tank, an evaporation line for connecting the fuel tank with the canister, and a purge line for connecting the canister with the intake system of the internal combustion engine, wherein the purge line is connected with the intake system by way of an evaporation valve, wherein the pressure introduction apparatus includes an accumulator for introducing a negative pressure in the intake system of the internal combustion engine so as to perform the pressure accumulation, a first accumulation-pressure control valve provided between the canister and the purge line, and a second accumulation-pressure control valve provided between the accumulator and the purge line, and wherein when a negative pressure in the intake system is introduced into the pressure introduction apparatus, the controller opens each of the evaporation valve and the second accumulation-pressure control valve and closes the first accumulation-pressure control valve, and when the accumulated negative pressure is introduced into the fuel-evaporation-gas path and when the determination apparatus performs the determination, the controller closes the evaporation valve and opens each of the first accumulation-pressure control valve and the second accumulation-pressure control valve.

(Appendix 6) The failure diagnosis apparatus for a fuel-evaporation-gas purging system according to any one of appendixes 1 through 4, wherein the fuel-evaporation-gas path includes the fuel tank, an evaporation line for connecting the fuel tank with the canister, and a purge line for connecting the canister with the intake system of the internal combustion engine, wherein the purge line is connected with the intake system by way of an evaporation valve, wherein the pressure introduction apparatus includes an accumulator for introducing a negative pressure in the intake system of the internal combustion engine so as to perform the pressure accumulation, a third accumulation-pressure control valve provided between the purge line and the evaporation valve, and a fourth accumulation-pressure control valve provided between the accumulator and the evaporation valve, and wherein when a negative pressure in the intake system is introduced into the pressure introduction apparatus, the controller opens each of the evaporation valve and the fourth accumulation-pressure control valve and closes the third accumulation-pressure control valve, and when the accumulated negative pressure is introduced into the fuel-evaporation-gas path and when the determination apparatus performs the determination, the controller closes the evaporation valve and opens each of the third accumulation-pressure control valve and the fourth accumulation-pressure control valve.

(Appendix 7) The failure diagnosis apparatus for a fuel-evaporation-gas purging system according to any one of appendixes 1 through 4, wherein the fuel-evaporation-gas path includes the fuel tank, an evaporation line for connecting the fuel tank with the canister, and a purge line for connecting the canister with the intake system of the internal combustion engine, wherein the purge line is connected with the intake system by way of an evaporation valve, wherein the pressure introduction apparatus includes an accumulator for introducing a negative pressure in the intake system of the internal combustion engine so as to perform the pressure accumulation and a fifth accumulation-pressure control valve provided between the accumulator and the evaporation valve, and wherein when a negative pressure in the intake system is introduced into the pressure introduction apparatus, the controller opens each of the evaporation valve and the fifth accumulation-pressure control valve, and when the accumulated negative pressure is introduced into the fuel-evaporation-gas path and when the determination apparatus performs the determination, the controller closes the evaporation valve and opens the fifth accumulation-pressure control valve.

(Appendix 8) The failure diagnosis apparatus for a fuel-evaporation-gas purging system according to any one of appendixes 1 through 4, wherein the fuel-evaporation-gas path includes the fuel tank, an evaporation line for connecting the fuel tank with the canister, and a purge line for connecting the canister with the intake system of the internal combustion engine, wherein the purge line is connected with the intake system by way of an evaporation valve, wherein the pressure introduction apparatus includes an accumulator for introducing a negative pressure in the intake system of the internal combustion engine so as to perform the pressure accumulation and a sixth accumulation-pressure control valve provided between the accumulator and the evaporation valve, and wherein when a negative pressure in the intake system is introduced into the pressure introduction apparatus, the controller opens each of the evaporation valve and the sixth accumulation-pressure control valve, and when the accumulated negative pressure is introduced into the fuel-evaporation-gas path and when the determination apparatus performs the determination, the controller closes the evaporation valve and opens the sixth accumulation-pressure control valve.

(Appendix 9) The failure diagnosis apparatus for a fuel-evaporation-gas purging system according to any one of appendixes 1 through 8, wherein when the driver turns on the ignition key, the controller is supplied with a power source, wherein when the driver turns off the ignition key, the controller starts self-holding of the power source, and wherein after the pressure introduction apparatus introduces a negative pressure in the intake system of the internal combustion engine so as to perform the pressure accumulation and then introduces the accumulated negative pressure into the fuel-evaporation-gas path, the controller cancels the self-holding of the power source.

(Appendix 10) The failure diagnosis apparatus for a fuel-evaporation-gas purging system according to any one of appendixes 2 through 8, wherein when the driver turns on the ignition key, the controller is supplied with a power source, wherein when the driver turns off the ignition key, the controller starts self-holding of the power source, and wherein after the pressure introduction apparatus introduces a negative pressure in the intake system so as to perform the pressure accumulation, the controller cancels the self-holding of the power source.

(Appendix 11) A failure diagnosis method that diagnoses whether or not a failure exists in a fuel-evaporation-gas purging system in which a fuel evaporation gas produced in a fuel tank is absorbed by an absorbent provided in a canister and in which a fuel evaporation gas absorbed by the absorbent is purged so as to be radiated into an intake system of an internal combustion engine, the failure diagnosis method comprising:

a first process of introducing a negative pressure in the intake system of the internal combustion engine into an accumulator so as to perform pressure accumulation;

a second process of introducing the accumulated negative pressure into a fuel-evaporation-gas path through which the fuel evaporation gas flows; and a third process of determining whether or not leakage of the fuel evaporation gas exists, based on a pressure change in the fuel-evaporation-gas path into which the negative pressure has been introduced, wherein the first process is performed in a time period from a time when a driver of a vehicle provided with the internal combustion engine turns off an ignition key to a time when the internal combustion engine stops its rotation, wherein the second process is performed in a time period from a time when the driver turns off the ignition key to a time when the internal combustion engine stops its rotation or after the internal combustion engine stops the rotation, wherein the third process is performed in a time period from a time when after the internal combustion engine has stopped the rotation, the driver again turns on the ignition key to a time when the internal combustion engine starts, and wherein based on a result of the determination in the third process, it is diagnosed whether or not a failure exists in the fuel-evaporation-gas purging system.

(Appendix 12) A failure diagnosis method that diagnoses whether or not a failure exists in a fuel-evaporation-gas purging system in which a fuel evaporation gas produced in a fuel tank is absorbed by an absorbent provided in a canister and in which a fuel evaporation gas absorbed by the absorbent is purged so as to be radiated into an intake system of an internal combustion engine, the failure diagnosis method comprising:

a first process of introducing a negative pressure in the intake system of the internal combustion engine into an accumulator so as to perform pressure accumulation;

a second process of introducing the accumulated negative pressure into a fuel-evaporation-gas path through which the fuel evaporation gas flows; and a third process of determining whether or not leakage of the fuel evaporation gas exists, based on a pressure change in the fuel-evaporation-gas path into which the negative pressure has been introduced, wherein the first process is performed in a time period from a time when a driver of a vehicle provided with the internal combustion engine turns off an ignition key to a time when the internal combustion engine stops its rotation, wherein each of the second process and the third process is performed in a time period from a time when after the internal combustion engine has stopped the rotation, the driver again turns on the ignition key to a time when the internal combustion engine starts, and wherein based on a result of the determination in the third process, it is diagnosed whether or not a failure exists in the fuel-evaporation-gas purging system.

What is claimed is:

1. A failure diagnosis apparatus that diagnoses whether or not a failure exists in a fuel-evaporation-gas purging system in which a fuel evaporation gas produced in a fuel tank is absorbed by an absorbent provided in a canister and in which a fuel evaporation gas absorbed by the absorbent is purged so as to be radiated into an intake system of an internal combustion engine, the failure diagnosis apparatus comprising:

a pressure introduction apparatus that introduces an accumulated pressure into a fuel-evaporation-gas path through which the fuel evaporation gas flows;

a determination apparatus that determines whether or not leakage of a fuel evaporation gas exists in the fuel-evaporation-gas path, based on a pressure in the fuel-evaporation-gas path; and a controller that controls at least the pressure introduction apparatus and the determination apparatus, wherein the pressure introduction apparatus is controlled by the controller to introduce a negative pressure in the intake system of the internal combustion engine so as to perform pressure accumulation in a time period from a time when a driver of a vehicle provided with the internal combustion engine turns off an ignition key to a time when the internal combustion engine stops its rotation and to introduce the accumulated negative pressure into the fuel-evaporation-gas path at a time that is one of before the internal combustion engine stops the rotation and after the internal combustion engine has stopped the rotation, wherein the determination apparatus is controlled by the controller to determine the pressure in the fuel-evaporation-gas path into which the negative pressure had been introduced in a time period from a time when after the internal combustion engine has stopped the rotation, the driver turns on the ignition key to a time when the internal combustion engine starts, wherein the controller diagnoses whether or not a failure exists in the fuel-evaporation-gas purging system, based on a result of the determination by the determination apparatus, wherein the fuel-evaporation-gas path comprises a purge line, wherein a first end of the purge line comprises an evaporation valve through which the purge line is connected with the intake system of the internal combustion engine, and wherein a second end of the purge line, opposite to the first end of the purge line, comprises a first valve, through which the canister is connected to the purge line, and a second valve through which an accumulator of the pressure introduction apparatus is connected to the purge line.

2. The failure diagnosis apparatus for a fuel-evaporation-gas purging system according to claim 1, wherein the pressure introduction apparatus is controlled by the controller to introduce the accumulated pressure into the fuel-evaporation-gas path when the accumulated pressure is the same as or lower than a predetermined value.

3. The failure diagnosis apparatus for a fuel-evaporation-gas purging system according to claim 1, wherein the determination apparatus is controlled by the controller to perform the determination when in a process from a time when the driver turns on the ignition key to a time when the internal combustion engine starts, a difference between a coolant temperature of the internal combustion engine at a time when the internal combustion engine has most recently stopped its rotation and the coolant temperature at a time immediately prior to a present start of the internal combustion engine is larger than a predetermined value and the coolant temperature at the time immediately prior to the present start of the internal combustion engine is lower than a predetermined value.

4. The failure diagnosis apparatus for a fuel-evaporation-gas purging system according to claim 1, wherein the fuel-evaporation-gas path further includes the fuel tank and an evaporation line for connecting the fuel tank with the canister, wherein the accumulator is configured to introduce a negative pressure in the intake system of the internal combustion engine so as to perform the pressure accumulation, wherein the pressure introduction apparatus further includes, as the first valve, a first accumulation-pressure control valve provided between the canister and the purge line, and, as the second valve, a second accumulation-pressure control valve provided between the accumulator and the purge line, and wherein when a negative pressure in the intake system is introduced into the pressure introduction apparatus, the controller opens each of the evaporation valve and the second accumulation-pressure control valve and closes the first accumulation-pressure control valve, and when the accumulated negative pressure is introduced into the fuel-evaporation-gas path and when the determination apparatus performs the determination, the controller closes the evaporation valve and opens each of the first accumulation-pressure control valve and the second accumulation-pressure control valve.

5. The failure diagnosis apparatus for a fuel-evaporation-gas purging system according to claim 1, wherein the fuel-evaporation-gas path further includes the fuel tank, an and an evaporation line for connecting the fuel tank with the canister, wherein the accumulator is configured to introduce a negative pressure in the intake system of the internal combustion engine so as to perform the pressure accumulation, wherein the pressure introduction apparatus further includes, as the first valve, a third accumulation-pressure control valve provided between the purge line and the evaporation valve, and, as the second valve, a fourth accumulation-pressure control valve provided between the accumulator and the evaporation valve, and wherein when a negative pressure in the intake system is introduced into the pressure introduction apparatus, the controller opens each of the evaporation valve and the fourth accumulation-pressure control valve and closes the third accumulation-pressure control valve, and when the accumulated negative pressure is introduced into the fuel-evaporation-gas path and when the determination apparatus performs the determination, the controller closes the evaporation valve and opens each of the third accumulation-pressure control valve and the fourth accumulation-pressure control valve.

6. The failure diagnosis apparatus for a fuel-evaporation-gas purging system according to claim 1, wherein the fuel-evaporation-gas path further includes the fuel tank, an, and an evaporation line for connecting the fuel tank with the canister, wherein accumulator is configured to introduce a negative pressure in the intake system of the internal combustion engine so as to perform the pressure accumulation, wherein the pressure introduction apparatus further includes as the second valve, a fifth accumulation-pressure control valve provided between the accumulator and the evaporation valve, and wherein when a negative pressure in the intake system is introduced into the pressure introduction apparatus, the controller opens each of the evaporation valve and the fifth accumulation-pressure control valve, and when the accumulated negative pressure is introduced into the fuel-evaporation-gas path and when the determination apparatus performs the determination, the controller closes the evaporation valve and opens the fifth accumulation-pressure control valve.

7. The failure diagnosis apparatus for a fuel-evaporation-gas purging system according to claim 1, wherein the fuel-evaporation-gas path further includes the fuel tank, and an evaporation line for connecting the fuel tank with the canister, wherein the accumulator is configured to introduce a negative pressure in the intake system of the internal combustion engine so as to perform the pressure accumulation, wherein the pressure introduction apparatus further includes, as the second valve, a sixth accumulation-pressure control valve provided between the accumulator and the evaporation valve, and wherein when a negative pressure in the intake system is introduced into the pressure introduction apparatus, the controller opens each of the evaporation valve and the sixth accumulation-pressure control valve, and when the accumulated negative pressure is introduced into the fuel-evaporation-gas path and when the determination apparatus performs the determination, the controller closes the evaporation valve and opens the sixth accumulation-pressure control valve.

8. The failure diagnosis apparatus for a fuel-evaporation-gas purging system according to claim 1, wherein when the driver turns on the ignition key, the controller is supplied with a power source, wherein when the driver turns off the ignition key, the controller starts self-holding of the power source, and wherein after the pressure introduction apparatus introduces a negative pressure in the intake system of the internal combustion engine so as to perform the pressure accumulation and then introduces the accumulated negative pressure into the fuel-evaporation-gas path, the controller cancels the self-holding of the power source.

9. A failure diagnosis apparatus that diagnoses whether or not a failure exists in a fuel-evaporation-gas purging system in which a fuel evaporation gas produced in a fuel tank is absorbed by an absorbent provided in a canister and in which a fuel evaporation gas absorbed by the absorbent is purged so as to be radiated into an intake system of an internal combustion engine, the failure diagnosis apparatus comprising:

a pressure introduction apparatus that introduces an accumulated pressure into a fuel-evaporation-gas path through which the fuel evaporation gas flows;

a determination apparatus that determines whether or not leakage of a fuel evaporation gas exists in the fuel-evaporation-gas path, based on a pressure in the fuel-evaporation-gas path; and a controller that controls at least the pressure introduction apparatus and the determination apparatus, wherein the pressure introduction apparatus is controlled by the controller to introduce a negative pressure in the intake system of the internal combustion engine and complete the pressure accumulation in a time period from a time when a driver of a vehicle provided with the internal combustion engine turns off an ignition key to a time when the internal combustion engine stops its rotation, wherein the pressure introduction apparatus is further controlled by the controller to introduce the accumulated negative pressure into the fuel-evaporation-gas path in a time period from a time when after the internal combustion engine has stopped the rotation, the driver turns on the ignition key to a time when the internal combustion engine starts, wherein the determination apparatus is controlled by the controller to determine whether or not a pressure in the fuel-evaporation-gas path into which the negative pressure had been introduced has changed in a time period from a time when the driver turns on the ignition key to a time when the internal combustion engine starts, and wherein the controller diagnoses whether or not a failure exists in the fuel-evaporation-gas purging system, based on a result of the determination by the determination apparatus, wherein the fuel-evaporation-gas path comprises a purge line, wherein a first end of the purge line comprises an evaporation valve through which the purge line is connected with the intake system of the internal combustion engine, and wherein a second end of the purge line, opposite to the first end of the purge line, comprises a first valve, through which the canister is connected to the purge line, and a second valve through which an accumulator of the pressure introduction apparatus is connected to the purge line.

10. The failure diagnosis apparatus for a fuel-evaporation-gas purging system according to claim 1, wherein the fuel-evaporation-gas path further includes the fuel tank and an evaporation line for connecting the fuel tank with the canister, wherein the accumulator is configured to introduce a negative pressure in the intake system of the internal combustion engine so as to perform the pressure accumulation.

11. The failure diagnosis apparatus for a fuel-evaporation-gas purging system according to claim 9, wherein the pressure introduction apparatus is controlled by the controller to introduce the accumulated pressure into the fuel-evaporation-gas path when the accumulated pressure is the same as or lower than a predetermined value.

12. The failure diagnosis apparatus for a fuel-evaporation-gas purging system according to claim 9, wherein the determination apparatus is controlled by the controller to perform the determination when in a process from a time when the driver turns on the ignition key to a time when the internal combustion engine starts, a difference between a coolant temperature of the internal combustion engine at a time when the internal combustion engine has most recently stopped its rotation and the coolant temperature at a time immediately prior to a present start of the internal combustion engine is larger than a predetermined value and the coolant temperature at the time immediately prior to the present start of the internal combustion engine is lower than a predetermined value.

13. The failure diagnosis apparatus for a fuel-evaporation-gas purging system according to claim 9, wherein the fuel-evaporation-gas path further includes the fuel tank and an evaporation line for connecting the fuel tank with the canister, wherein the accumulator is configured to introduce a negative pressure in the intake system of the internal combustion engine so as to perform the pressure accumulation, wherein the pressure introduction apparatus further includes, as the first valve, a first accumulation-pressure control valve provided between the canister and the purge line, and, as the second valve, a second accumulation-pressure control valve provided between the accumulator and the purge line, and wherein when a negative pressure in the intake system is introduced into the pressure introduction apparatus, the controller opens each of the evaporation valve and the second accumulation-pressure control valve and closes the first accumulation-pressure control valve, and when the accumulated negative pressure is introduced into the fuel-evaporation-gas path and when the determination apparatus performs the determination, the controller closes the evaporation valve and opens each of the first accumulation-pressure control valve and the second accumulation-pressure control valve.

14. The failure diagnosis apparatus for a fuel-evaporation-gas purging system according to claim 9, wherein the fuel-evaporation-gas path further includes the fuel tank and an evaporation line for connecting the fuel tank with the canister, wherein the accumulator is configured to introduce a negative pressure in the intake system of the internal combustion engine so as to perform the pressure accumulation, wherein the pressure introduction apparatus further includes, as the first valve, a third accumulation-pressure control valve provided between the purge line and the evaporation valve, and, as the second valve, a fourth accumulation-pressure control valve provided between the accumulator and the evaporation valve, and wherein when a negative pressure in the intake system is introduced into the pressure introduction apparatus, the controller opens each of the evaporation valve and the fourth accumulation-pressure control valve and closes the third accumulation-pressure control valve, and when the accumulated negative pressure is introduced into the fuel-evaporation-gas path and when the determination apparatus performs the determination, the controller closes the evaporation valve and opens each of the third accumulation-pressure control valve and the fourth accumulation-pressure control valve.

15. The failure diagnosis apparatus for a fuel-evaporation-gas purging system according to claim 9, wherein the fuel-evaporation-gas path further includes the fuel tank and an evaporation line for connecting the fuel tank with the canister, wherein the accumulator is configured to introduce a negative pressure in the intake system of the internal combustion engine so as to perform the pressure accumulation, wherein the pressure introduction apparatus further includes, as the second valve, a fifth accumulation-pressure control valve provided between the accumulator and the evaporation valve, and wherein when a negative pressure in the intake system is introduced into the pressure introduction apparatus, the controller opens each of the evaporation valve and the fifth accumulation-pressure control valve, and when the accumulated negative pressure is introduced into the fuel-evaporation-gas path and when the determination apparatus performs the determination, the controller closes the evaporation valve and opens the fifth accumulation-pressure control valve.

16. The failure diagnosis apparatus for a fuel-evaporation-gas purging system according to claim 9, wherein the fuel-evaporation-gas path further includes the fuel tank, and an evaporation line for connecting the fuel tank with the canister, wherein the accumulator is configured to introduce a negative pressure in the intake system of the internal combustion engine so as to perform the pressure accumulation, wherein the pressure introduction apparatus further includes, as the second valve, a sixth accumulation-pressure control valve provided between the accumulator and the evaporation valve, and wherein when a negative pressure in the intake system is introduced into the pressure introduction apparatus, the controller opens each of the evaporation valve and the sixth accumulation-pressure control valve, and when the accumulated negative pressure is introduced into the fuel-evaporation-gas path and when the determination apparatus performs the determination, the controller closes the evaporation valve and opens the sixth accumulation-pressure control valve.

17. The failure diagnosis apparatus for a fuel-evaporation-gas purging system according to claim 9, wherein when the driver turns on the ignition key, the controller is supplied with a power source, wherein when the driver turns off the ignition key, the controller starts self-holding of the power source, and wherein after the pressure introduction apparatus introduces a negative pressure in the intake system of the internal combustion engine so as to perform the pressure accumulation and then introduces the accumulated negative pressure into the fuel-evaporation-gas path, the controller cancels the self-holding of the power source.

18. The failure diagnosis apparatus for a fuel-evaporation-gas purging system according to claim 9, wherein when the driver turns on the ignition key, the controller is supplied with a power source, wherein when the driver turns off the ignition key, the controller starts self-holding of the power source, and wherein after the pressure introduction apparatus introduces a negative pressure in the intake system so as to perform the pressure accumulation, the controller cancels the self-holding of the power source.

19. A failure diagnosis method that diagnoses whether or not a failure exists in a fuel-evaporation-gas purging system in which a fuel evaporation gas produced in a fuel tank is absorbed by an absorbent provided in a canister and in which a fuel evaporation gas absorbed by the absorbent is purged so as to be radiated into an intake system of an internal combustion engine, the failure diagnosis method comprising:

a first process of introducing a negative pressure in the intake system of the internal combustion engine into an accumulator so as to perform pressure accumulation;

a second process of introducing the accumulated negative pressure into a fuel-evaporation-gas path through which the fuel evaporation gas flows; and a third process of determining whether or not leakage of the fuel evaporation gas exists, based on a pressure in the fuel-evaporation-gas path into which the negative pressure has been introduced, wherein the first process is performed in a time period from a time when a driver of a vehicle provided with the internal combustion engine turns off an ignition key to a time when the internal combustion engine stops its rotation, wherein the second process is performed in a time period from a time when the driver turns off the ignition key to a time when the internal combustion engine stops its rotation or after the internal combustion engine stops the rotation, wherein the third process is performed in a time period from a time when after the internal combustion engine has stopped the rotation, the driver again turns on the ignition key to a time when the internal combustion engine starts, wherein based on a result of the determination in the third process, it is diagnosed whether or not a failure exists in the fuel-evaporation-gas purging system, wherein the fuel-evaporation-gas path comprises a purge line, wherein a first end of the purge line comprises an evaporation valve through which the purge line is connected with the intake system of the internal combustion engine, wherein a second end of the purge line, opposite to the first end of the purge line, comprises a first valve, through which the canister is connected to the purge line, and a second valve through which an accumulator of the pressure introduction apparatus is connected to the purge line, and wherein the method further comprises controlling, by the controller, the first valve and the second valve.

20. A failure diagnosis method that diagnoses whether or not a failure exists in a fuel-evaporation-gas purging system in which a fuel evaporation gas produced in a fuel tank is absorbed by an absorbent provided in a canister and in which a fuel evaporation gas absorbed by the absorbent is purged so as to be radiated into an intake system of an internal combustion engine, the failure diagnosis method comprising:

a first process of introducing a negative pressure in the intake system of the internal combustion engine into an accumulator so as to perform pressure accumulation;

a second process of introducing the accumulated negative pressure into a fuel-evaporation-gas path through which the fuel evaporation gas flows; and a third process of determining whether or not leakage of the fuel evaporation gas exists, based on a pressure in the fuel-evaporation-gas path into which the negative pressure has been introduced, wherein the first process is performed in a time period from a time when a driver of a vehicle provided with the internal combustion engine turns off an ignition key to a time when the internal combustion engine stops its rotation, wherein each of the second process and the third process is performed in a time period from a time when after the internal combustion engine has stopped the rotation, the driver again turns on the ignition key to a time when the internal combustion engine starts, wherein based on a result of the determination in the third process, it is diagnosed whether or not a failure exists in the fuel-evaporation-gas purging system, wherein the fuel-evaporation-gas path comprises a purge line, wherein a first end of the purge line comprises an evaporation valve through which the purge line is connected with the intake system of the internal combustion engine, wherein a second end of the purge line, opposite to the first end of the purge line, comprises a first valve, through which the canister is connected to the purge line, and a second valve through which an accumulator of the pressure introduction apparatus is connected to the purge line, and wherein the method further comprises controlling, by the controller, the first valve and the second valve.

* * * * *